Figure 1:
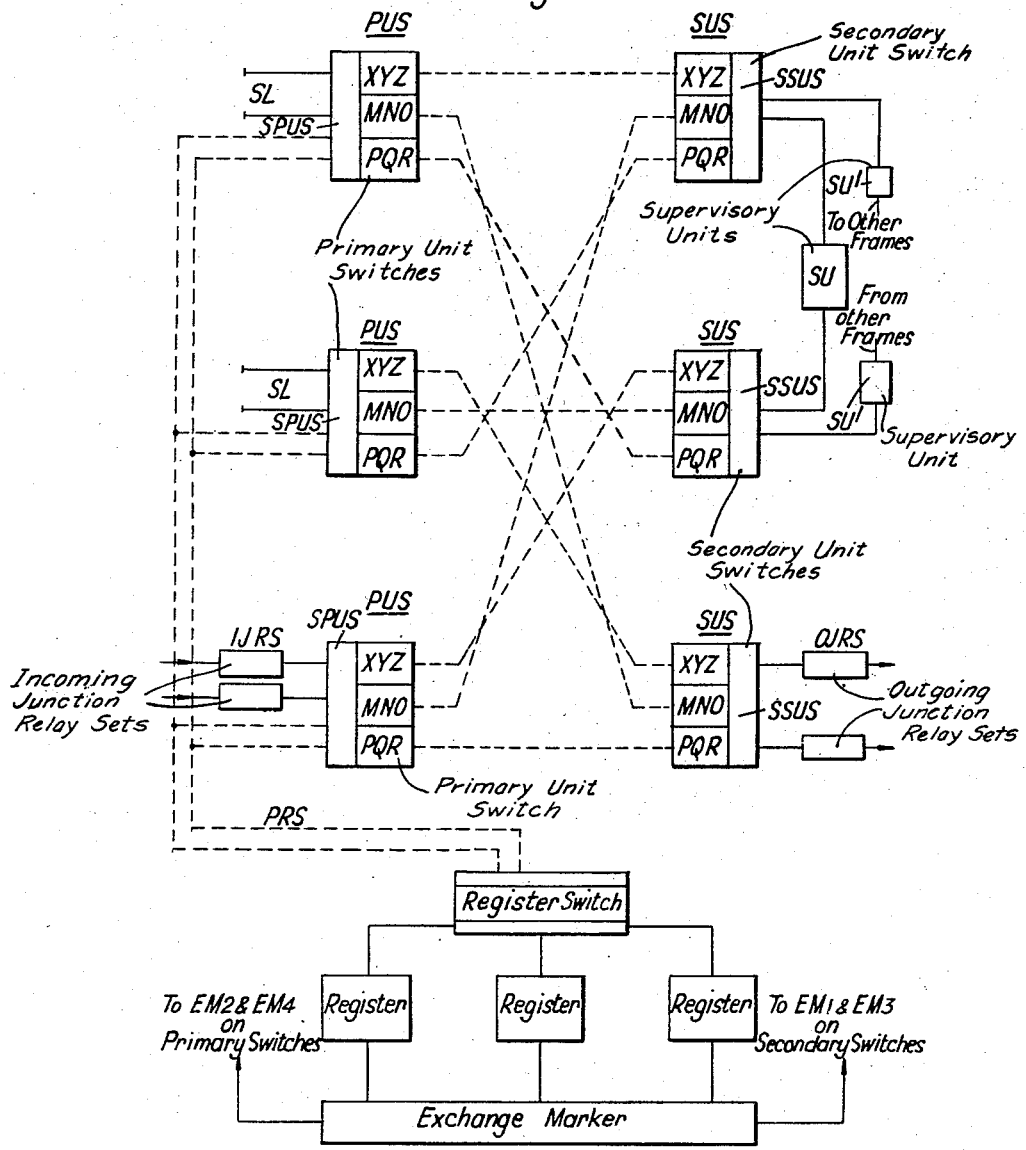

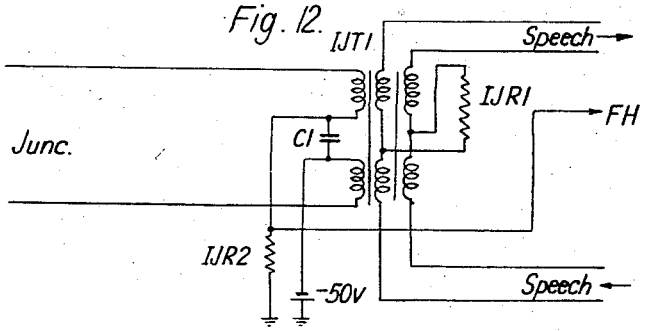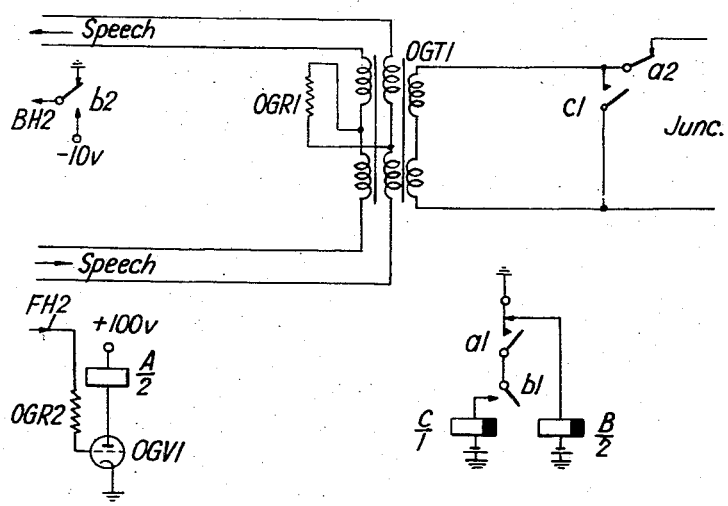

Inventor
JOHN EDWARD FLOOD

By

Attorney

Nov. 4, 1958 — J. E. FLOOD — 2,859,280
ELECTRICAL SWITCHING SYSTEMS

Inventor
JOHN EDWARD FLOOD
By
Attorney

Inventor
JOHN EDWARD FLOOD

By

Attorney

United States Patent Office 2,859,280
Patented Nov. 4, 1958

2,859,280

ELECTRICAL SWITCHING SYSTEMS

John Edward Flood, Herne Hill, London, England, assignor, by mesne assignments, to Siemens Edison Swan Limited, London, England, a British company Application November 29, 1955, Serial No. 549,805

4 Claims. (Cl. 179—15)

This invention relates to electrical switching systems in which any one of a number of incoming lines may be connected to any one of a number of outgoing lines and more particularly to automatic telephone exchange switching systems.

It has been proposed in connection with automatic telephone exchange switching to effect connections electronically using selecting switches which operate on a time division multiplex basis. The selecting switches may be arranged in ranks, the outlets from the switches in one rank being connected to the inlets of the switches in succeeding ranks by audio frequency trunks individual to each outlet and inlet pair. In an exchange switching system of this kind each electronic switch has a plurality of inlets and outlets, which are linked within the switch by a single pulse highway. This pulse highway serves for the channels through the switch formed by the multiplex, pulses forming the channels being spaced apart in time. Speech over a pulse highway is achieved by modulation of the recurrent pulse of the time division multiplex (TDM) allocated to the channel, pulse modulating and demodulating equipment (hereinafter referred to as modems) being included with each inlet and each outlet for this purpose. The modems associated with one side of an electronic switch such as outlined above (i. e. either the inlets or the outlets) are each permanently associated with a different one of the recurring TDM pulses, while the modems on the other side of the switch are provided with common control arrangements by means of which any modem can be associated with any one of the recurring TDM pulses providing it is free. The side of the switch the modems of which are permanently associated with a TDM pulse is known as the fixed pulse or bank side, while the side of the switch the modems of which can be associated with any TDM pulse is referred to as the variable pulse or selector side.

The above conception of an electronic selecting switch can be extended by keeping the TDM pulses in a common pool so to speak and by allocating a free recurrent pulse for use of the modems of an inlet and outlet pair when required. With this arrangement both sides of the switches become in effect selector sides. The two sides of the switches may therefore be regarded as separate electronic unit switches which may be arranged to form adjacent switching ranks, thus enabling the audio frequency trunks normally required between switching ranks to be replaced by a single pulse highway. With this arrangement however, difficulties arise in that the transmission of adjacent channel TDM pulses over the common pulse highway may result in excessive cross-talk due to the distortion of the TDM pulses in transmission. Also the need to effect supervision of the individual connections through the exchange on a TDM basis may give rise to excessive complications and unreliability of the system as a whole.

In the present invention arrangements are provided in which these difficulties are overcome to a great extent.

According to one feature of the present invention, supervisory equipment is included in audio frequency trunks linking the selector sides of two adjacent ranks of switches the bank sides of which are connected to link pulse highways, there being a plurality of such audio frequency trunks between the said two ranks of switches and the supervisory equipment being individual to a trunk.

According to another feature of the invention, electronic switches of two ranks are arranged in the form of a frame, the selector sides of switches of one rank being connected to incoming and outgoing lines and the bank side of each switch being connected to the bank side of every switch of the other rank by link pulse highways, the selector sides of switches of the said other rank being connected by a plurality of audio frequency trunks in each of which is connected supervisory equipment individual to it.

According to another feature of the invention, different groups of recurrent pulses are allocated to the several link pulse highways, the pulses of a group not being consecutive in the TDM cycle.

According to another feature of the invention, connections within an automatic telephone exchange are set up over electronic switches using a time division multiplex system, the electronic switches being arranged to operate for calls in either direction, the switches operating as line finders also operating as final selectors, the arrangement being such that when a switch is operating as a line finder the recurrent pulse by means of which communication through the switch is effected is determined by equipment common to a plurality of said switches and when a switch is operating as a final selector the recurrent pulse by means of which communication through the switch is effected is determined by equipment included in a selecting switch of a preceding rank.

According to another feature of the invention, connections within an automatic telephone exchange are set up over electronic switches using the time division multiplex system with the aid of a register and the recurrent pulse used in the connection of an incoming switch to the register may differ from the recurrent pulse used in the connection of the register with an outgoing switch until the connection has been completely set up whereupon the pulse used in the incoming side of the register is removed and replaced by the pulse used in the outgoing side of the register and a through connection over a pulse highway between the incoming and outgoing switches is completed using the latter pulse.

In carrying out the invention, each electronic switch may be arranged to operate in a bothway manner and their selector sides may contain both inlets and outlets. Thus, of a pair of switches, one on either side of a frame which are connected by a pulse highway the switch on one side may perform switching functions analogous to those performed by a line finder and a final selector of an ordinary electromechanical switching system and the switch on the other side of the frame may perform switching functions analogous to those performed by group selecting switches in an ordinary electro-mechanical system. This permits of a trunking arrangement in which the time division multiplex pulse highways, hereinafter referred to as link pulse highways, serve to link the electronic unit switches on either side of the frame and the switches on the said other side of the frame may be interconnected with one another by connecting trunks linking individually the outlets and inlets of different unit switches. Furthermore, in the path of each of these latter trunks supervisory equipment is connected whereby each communication channel through the exchange may be supervised by equipment individual to each TDM channel through the exchange.

The path of a local connection through the exchange includes a switch that combines the functions of a line finder and final selector, hereinafter termed a primary unit switch, a first pulse highway, a secondary unit switch connecting the pulse highway of an audio frequency trunk including supervisory equipment, a second secondary unit switch connecting said audio frequency trunk to a second pulse highway and a second or the same primary unit switch connecting the second pulse highway to the outgoing line. It is to be understood that a switch for connecting with a pulse highway is really an aggregation of a number of switches any one of which may be employed for a connection and selected by electronic means. For example, a secondary unit switch may comprise a large number of smaller switches to which are connected incoming trunks and on the outgoing side are connected to a much smaller number of pulse highways. Connections through the exchange are set up with the aid of a register, of which a number may be provided, and a marker common to the exchange. For setting up a connection a free register is selected and connected to a primary unit switch acting as a line finder and the necessary routing information derived from the digits received in the register are transferred to the marker. The marker causes pulses in the multiplex that are not in use to be transmitted over a primary unit switch to be used as a final selector and having access to the called line and one set of pulse highways to secondary unit switches to which audio frequency trunks are connected. The pulses are converted to D. C. markings at the audio frequency links which cause pulses to appear on a second set of highways connecting the secondary switches to the primary unit switches. Due to the presence of gates in the connections to the several highways different groups of pulses appear on different highways and at the primary unit switch acting as a line finder a selection is made of a pulse amongst those transmitted over the highway of the second set to that switch. When this has been done the marker is released and the pulse used for the incoming connection at the primary unit switch acting as a line finder is removed and replaced by the selected pulse and the highways of the two sets are connected in tandem with the intervening audio frequency link. The through connection over the highways is completed by the removal of inhibitions on gates in the highways when the register is released as above mentioned.

As a guide to the capacity of exchanges using electronic unit switches arranged to form link frames, it can be seen that if there are 100 channels in the TDM system and 10 links between each unit switch on opposite sides of the frame, then each frame has ten unit switches on each side. It provides 1000 channels between the two sides of the frame and has a capacity of between 1000 and 10,000 lines according to the traffic per line. An exchange with 10 frames could have 100 trunks between each pair of frames and could accommodate between 10,000 and 100,000 lines depending on the traffic per line. The above figures would of course be reduced to a certain extent when junction traffic and the like is taken into account but the figures nevertheless give an indication of the size of exchange possible with the proposed arrangements.

A detailed description of one means of carrying out the invention will now be described by way of example with reference to the accompanying drawings.

Figure 2:
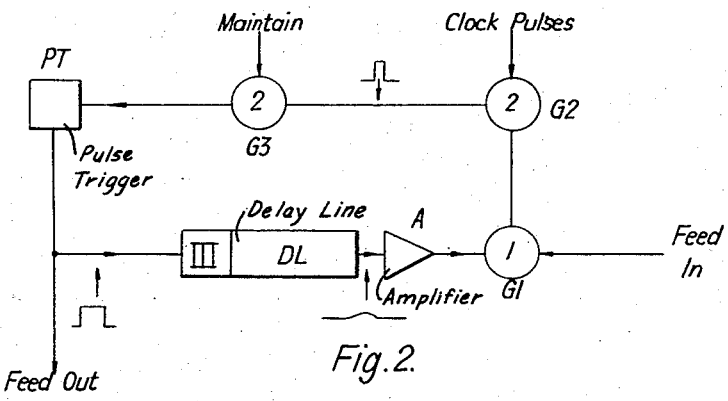
Figure 2A:
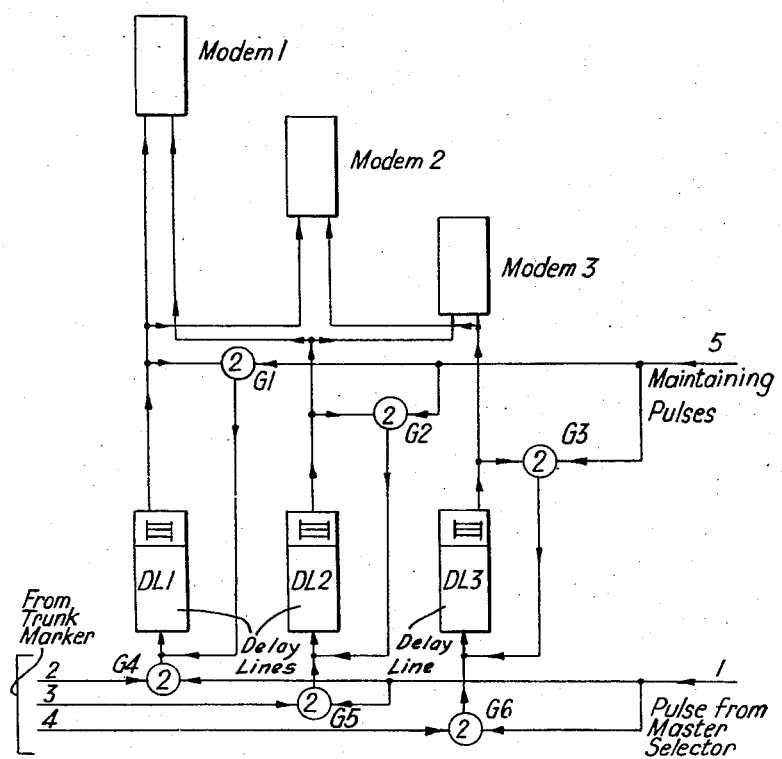
Figure 3:
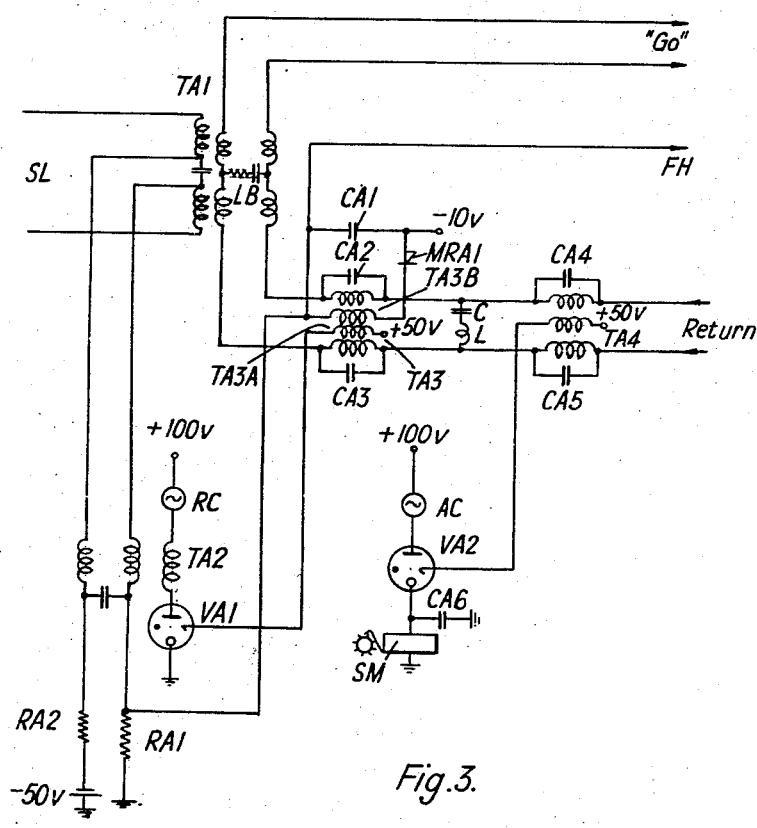
Figure 4:
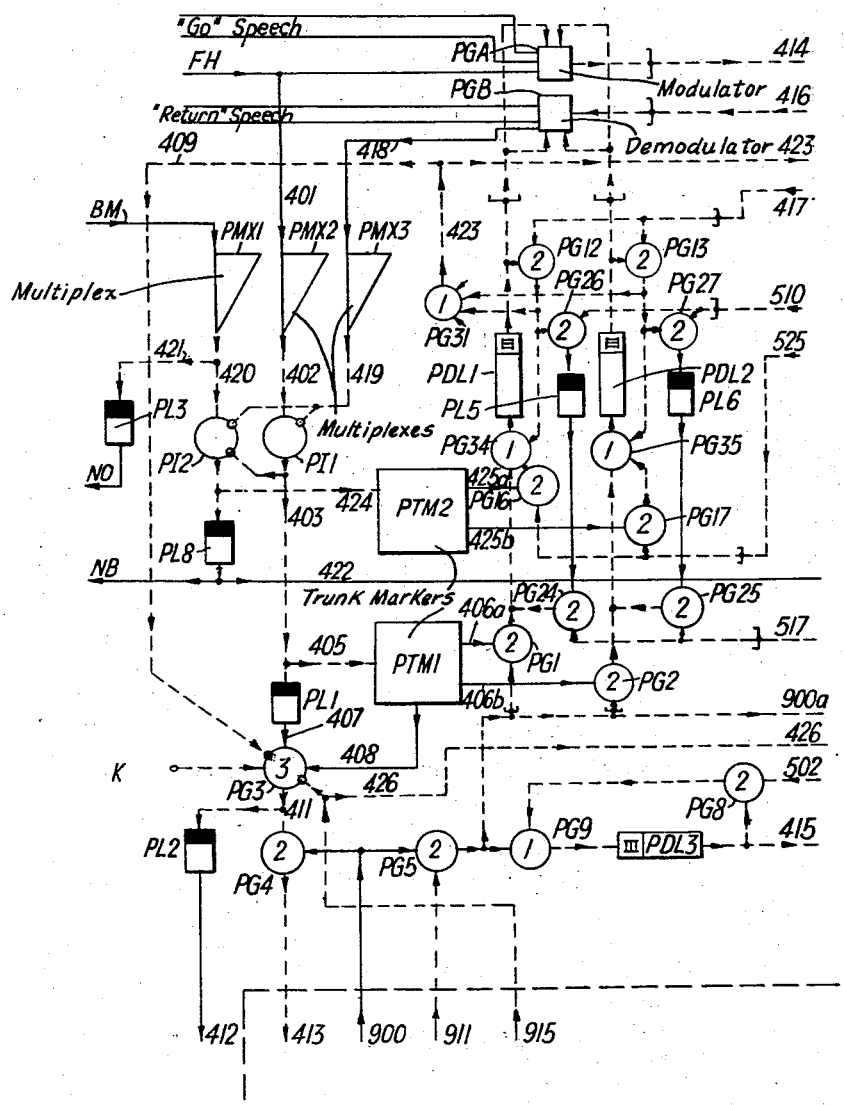
Figure 5:
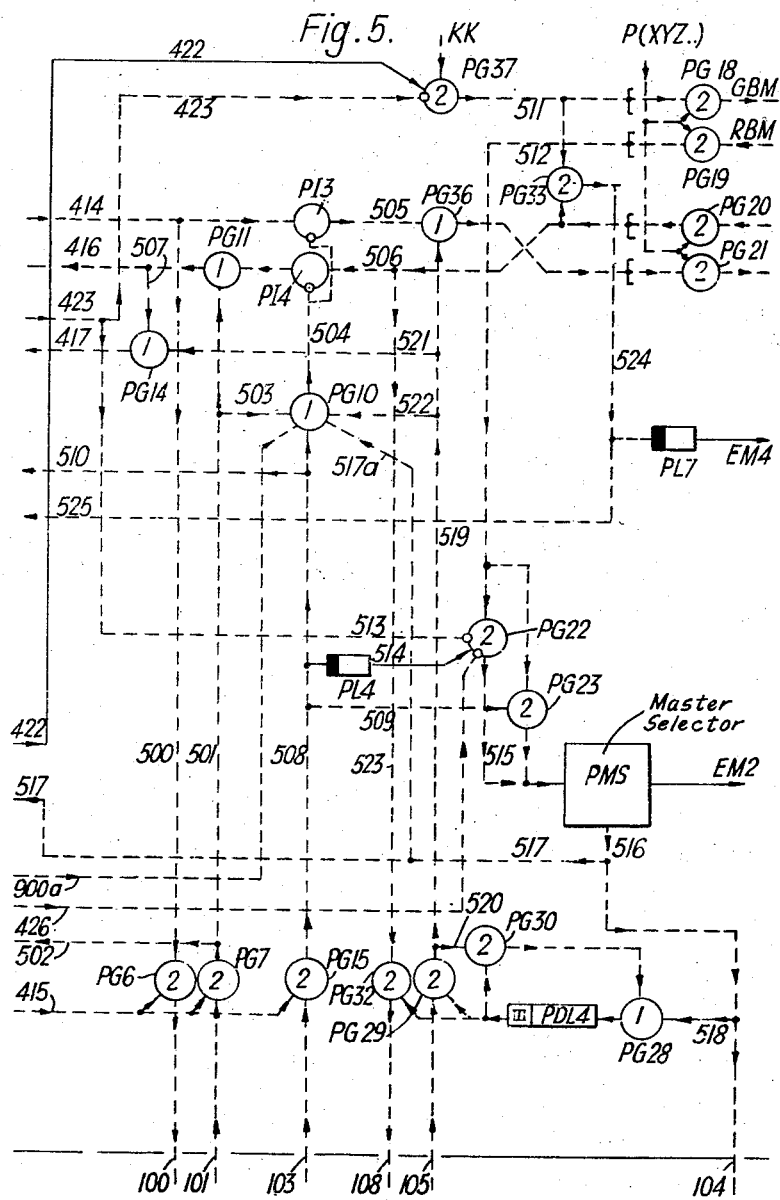
Figure 6:
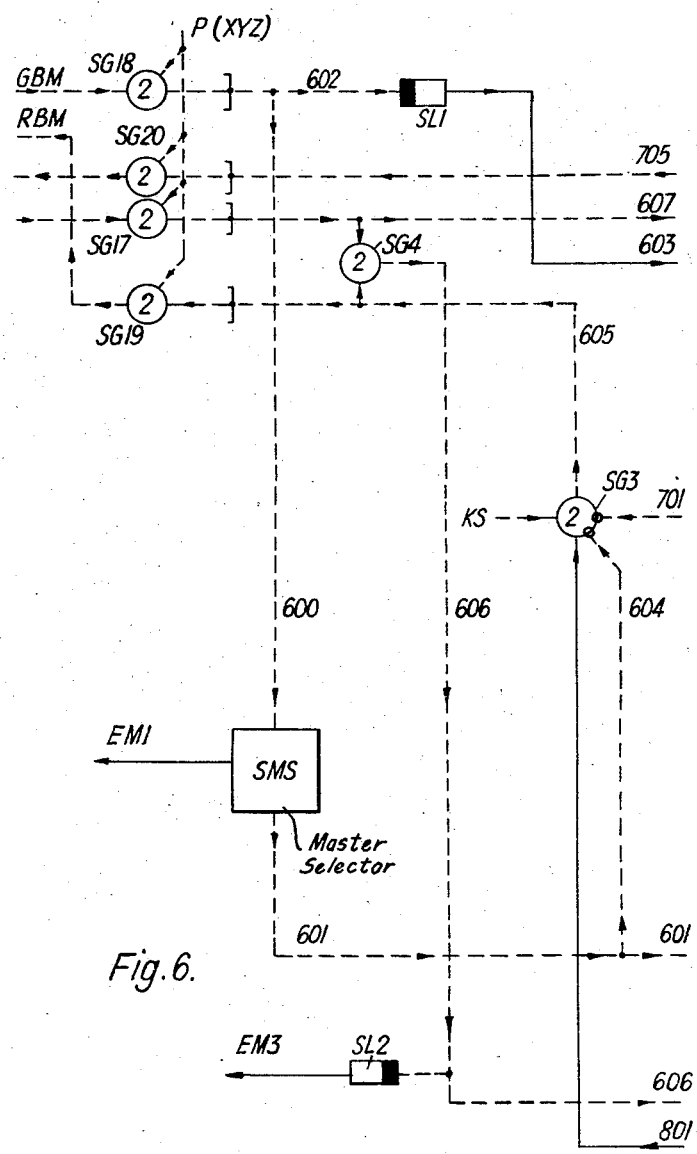
Figure 7:
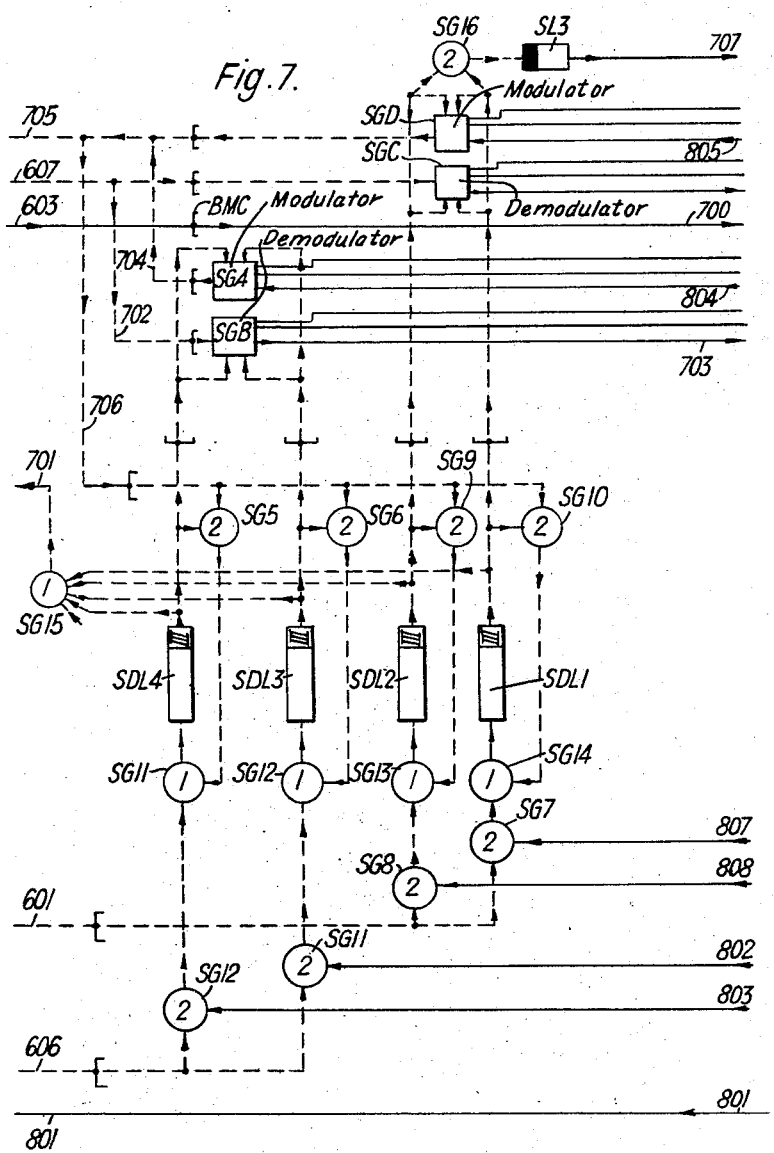
Figure 8:
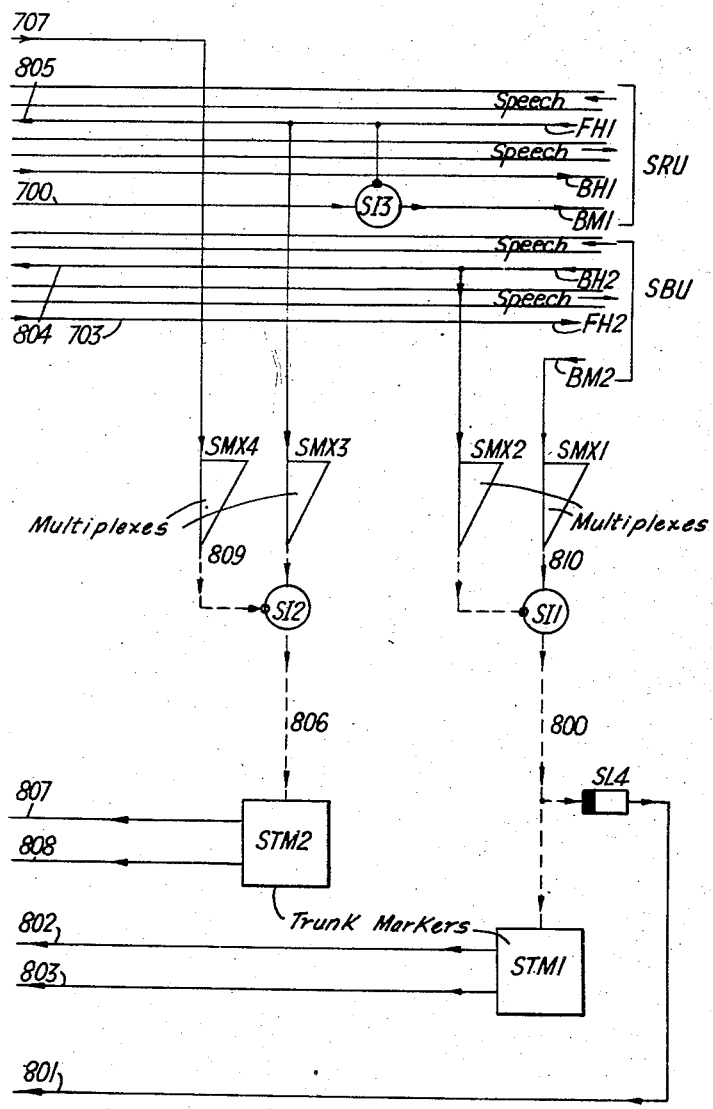
Figure 9:
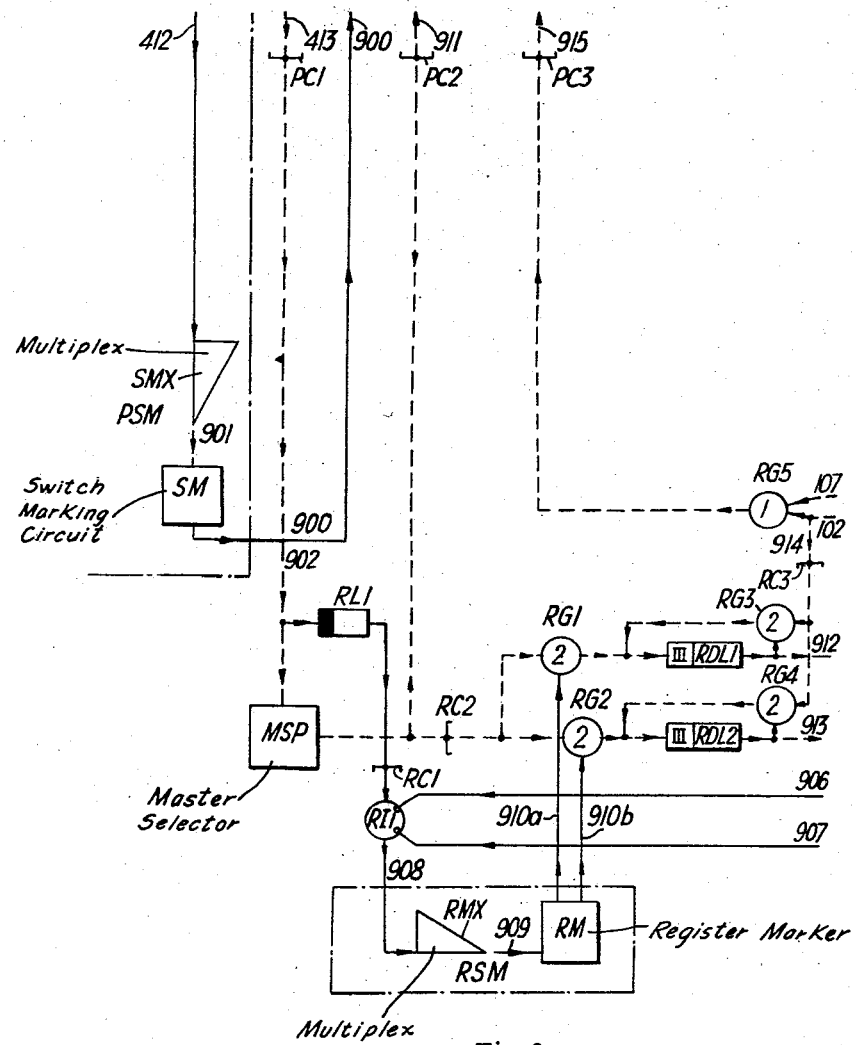
Figure 10:
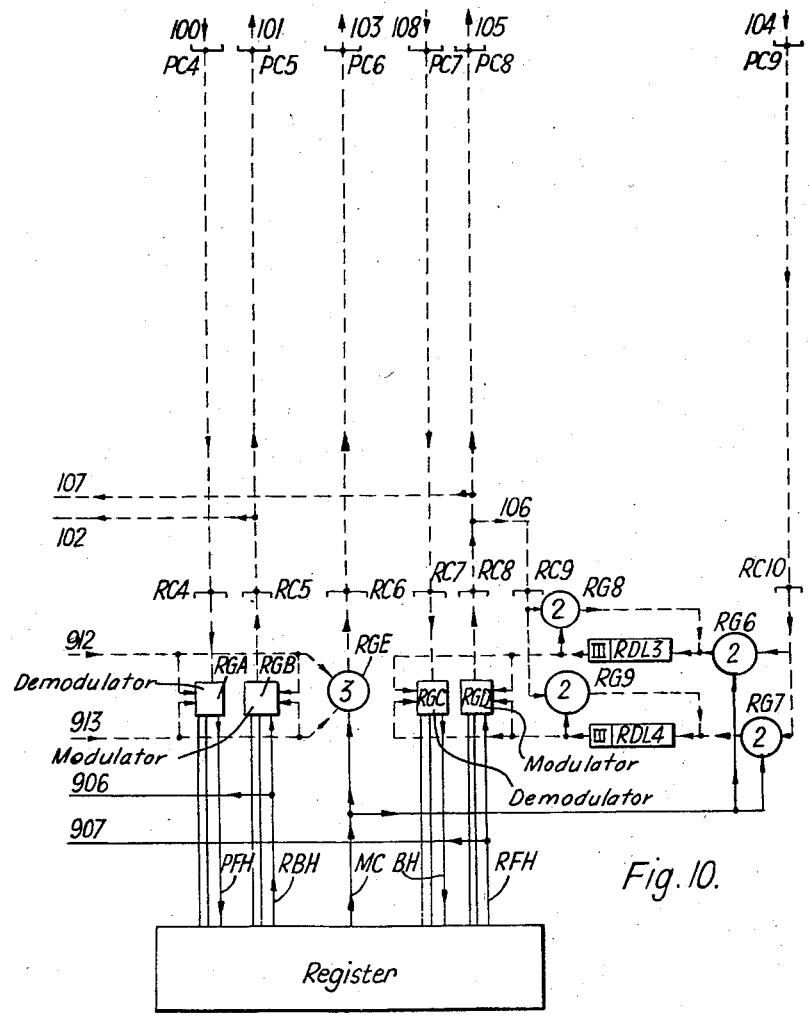
Figure 11:
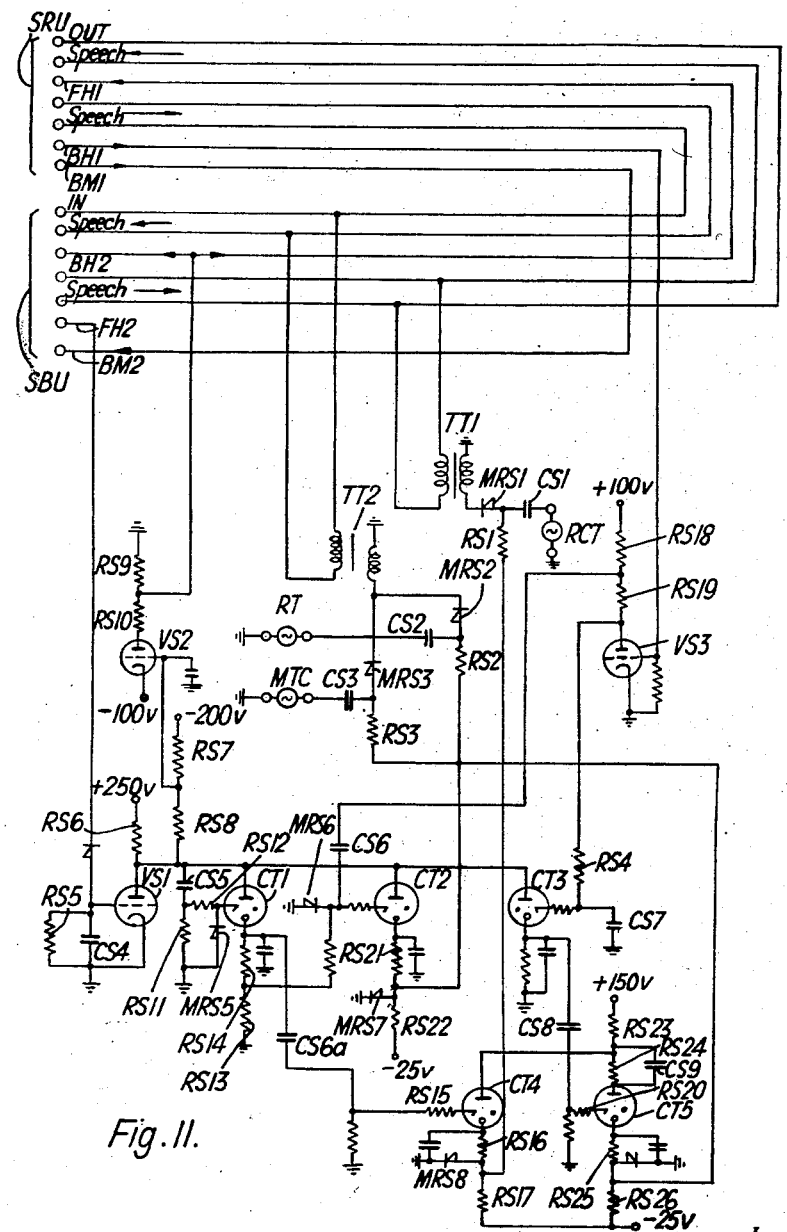

The accompanying drawings show sufficient of the detailed arrangements for a fully electronic telephone exchange to illustrate the invention. The drawings comprise Figs. 1–25. Fig. 1 is a simplified trunking diagram of the exchange, Figs. 2 and 2a are schematic diagrams of the main elements comprising a delay line circulation system used for pulse storage in the several switches in the system and Fig. 3 shows a simplified subscriber's line circuit. Figs. 4 and 5 show together a functional diagram of an electronic unit selecting switch which may serve either as a subscriber's selecting switch or as a junction selecting switch. Figs. 6, 7 and 8 show together a functional diagram of an electronic unit selecting switch for use in establishing connections between subscribers. Figs. 9 and 10 together show a functional diagram of an electronic register switch for coupling a register when required to a unit selecting switch on either side of a frame. Figs. 4 and 5 should be assembled with Fig. 5 to the right of Fig. 4 and Figs. 6, 7 and 8 should be assembled in order from left to right to the right of Fig. 5 and Figs. 9 and 10 should be assembled beneath Figs. 4 and 5 respectively. Figs. 4 and 5 may be taken to represent the functional arrangements of a primary unit switch, such as any one of those designated PUS in Fig. 1 and Figs. 6, 7 and 8 may be taken to represent the functional arrangements of a secondary unit switch, such as any one of those designated SUS in Fig. 1. Fig. 11 shows the circuits of a subscriber's supervisory circuit such as that designated SU in Fig. 1. Fig. 12 shows the circuits of an incoming junction relay set for connection to the selector side of a primary unit switch and Fig. 13 shows the circuits of an outgoing junction relay set for connection to the selector side of a secondary unit switch. Fig. 14–25 are detailed circuit diagrams explanatory of the less obvious elements illustrated in the functional diagrams of Figs. 4–10.

Reference will now be had to the simplified trunking diagram shown in Fig. 1. In this figure the electronic unit switches are indicated by the rectangles PUS and SUS. Subscribers' lines SL and incoming junction relay sets IJRS associated with incoming junctions are terminated on the selector side SPUS of the unit switches PUS via line circuits (not shown in this figure), while trunks leading to supervisory units, and outgoing junction relay sets OJRS associated with outgoing junctions, are terminated on the selector side SSUS of the unit switches SUS. The unit switches PUS are identical with one another and each has access over a pulse highway PRS to a register switch which is common to all the unit switches PUS in the switch frame. For convenience in description the unit switches PUS will hereinafter be referred to as primary unit switches and the unit switches SUS as secondary unit switches. The unit switches SUS are also identical with one another and are designed to enable calls to a local subscriber to be completed via a supervisory unit such as that indicated by the rectangle SU in the figure, or to give access to outgoing junctions via the outgoing junction relay sets terminated on their selector sides. For the sake of simplicity of explanation, the incoming junction relay sets are shown terminated on the selector side of a primary unit switch other than that to which the subscribers' line circuits are terminated, and the outgoing junction relay sets are shown connected to the selector side of a secondary unit switch other than that to which the local trunks containing supervisory units are terminated, although if required, a primary unit switch could have both subscribers' lines and incoming junction relay sets connected to its selector side and similarly a secondary unit switch could have trunks to supervisory units as well as to outgoing junction relay sets connected to its selector side without the circuit operation of the exchange being affected in any way.

Also for simplicity of explanation, the switch frame in this embodiment will be considered as comprising three primary unit switches such as PUS on the left hand side of the frame and three secondary unit switches such as SUS on the right hand side of the frame, although as previously stated there may be any number, say ten unit switches, on either side of a frame.

The bank side of each of the three primary unit switches is linked by separate link pulse highways to the bank side of each of the secondary unit switches on the other side of the frame, and within each switch these link pulse highways are commoned through gate circuits to the pulse highway from the selector side of the switch.

In the trunking diagram of Fig. 1, the gate circuits are represented by the rectangles PQR, XYZ, MNO and the opening of each gate circuit is controlled by a group of time division multiplex pulse trains so chosen that no group includes adjacent pulses in the multiplex. In this embodiment the link pulse highways carry both subscriber-originated and junction traffic. The selector sides of the primary unit switches are connected over a pulse highway indicated in Fig. 1 as PRS, through a register switch, to a group of registers. The registers shown in the diagram have access to an exchange marker common to the whole exchange.

In outline the operation of the exchange system of Fig. 1 is as follows. When a subscriber initiates a call, a potential generated in his line circuit and referred to hereinafter as a forward hold signal, is applied to the primary unit switch with which the subscriber is associated and causes this switch to pass a switch calling signal, together with all the TDM pulses not in use in the register or in the primary unit switch concerned, to a register switch. If more than one primary unit switch is calling at the same time, the register switch arbitrarily selects the one with which it will deal, and also one of the free TDM pulses indicated to it from the selected primary unit switch. The register switch then selects a free register and applies the selected TDM pulse to delay line storage circuits associated with both the calling line in the selected primary unit switch and with the selected register. The selected TDM pulse circulates in these delay line storage circuits and controls the modems associated with the register and with the calling line. In this way a communication path is established between the calling line and the register. The register returns dial tone to the calling subscriber who dials into the register by interruptions of the forward hold signal. The register stores the digital information, performs any translation required and applies for the use of the exchange marker. When the marker has received the routing information from the register, it applies a so-called backward marking signal to the called line. This marking is extended over all free paths through the exchange to the primary unit switch to which the calling subscriber is connected whereupon one of these free paths is selected for the completion of the required connection. The free paths backwardly marked and the manner of selection of one of these is different according to the destination of the call and a fuller explanation of the action in respect of various types of call is as follows.

If the called line is that of a subscriber served by a primary unit switch in the same exchange, the receipt of the backward marking signal from the exchange marker causes the primary unit switch to which the called subscriber is connected, to transmit, as backward marking signals from its bank side, all TDM pulses not already in use for other connections through this switch. The bank sides of the primary unit switches are linked to the secondary unit switches by means of link pulse highways and gate circuits, indicated in Fig. 1 at XYZ, PQR, MNO, in these highways are arranged to pass over each highway only those TDM pulses of the group, i. e. the group XYZ, the group PQR or the group MNO, allocated to the link pulse highway. The free backward marking TDM pulses are thus distributed over the appropriate link pulse highways. Each link pulse highway comprises a "go" and "return" backward marking pulse path and a "go" and "return" communication pulse path, and the backward marking TDM pulses are transmitted over the "go" backward marking pulse paths of these highways to the secondary unit switches in the same frame. Receipt of TDM backward marking pulses at the bank side of a secondary unit switch results in one of these pulses being in effect appropriated for the call and in a D. C. backward marking signal being applied to all free trunks outgoing from its selector side. The selector sides of the secondary unit switches are linked by audio frequency trunks each of which has a supervisory unit in its path, the outgoing trunks from one secondary unit switch being connected via supervisory units to the incoming trunks of other secondary unit switches in the same or other frames. The D. C. backward marking signals applied to the free outgoing trunks from a secondary unit switch are relayed through the supervisory units in the paths of these trunks and appear on the corresponding incoming trunks of other secondary unit switches. Receipt of D. C. backward marking signals on a number of trunks incoming to the selector side of a secondary unit switch results in one of these trunks being, in effect, appropriated for the call and in the transmission, as backward marking signals from its bank side, of all free TDM pulses over the "return" backward marking paths of its link pulse highways to the primary unit switches.

As a result of the above described action, the primary unit switch to which the calling subscriber is connected receives, as backward marking signals, all the TDM pulses which are free in secondary unit switches which can deal with the call. From these TDM pulses the primary unit switch selects one which is not already in use in the primary switch or the associated register switch and proceeds to use this pulse to establish the first stage of the wanted connection, i. e. connection in the "go" direction between the primary unit switch and a secondary unit switch on the other side of the frame. To do this, the primary unit switch stores the selected pulse in delay lines associated with calling subscriber's modem and with the outgoing side of the register. At the same time the selected pulse is transmitted as a forward hold signal over the "go" communication pulse path of the link pulse highway (the gate circuit of which permits the passage of this pulse), to the secondary unit switch from which the pulse was originally received as a backward marking signal. At the secondary unit switch the arrival over the "go" communication pulse path of a pulse coincident with one of the pulses it is transmitting over the "return" backward marking path indicates to this secondary unit switch that it is the one chosen to complete this stage of the connection. It will be recalled that during the backward marking process this secondary unit switch has, in effect, appropriated a trunk outgoing from its selector side which can be used for the call, and upon receipt of the forward hold signal described above, the secondary switch stores the pulse in the delay lines associated with the appropriated trunk and at the same time transmits a D. C. forward hold signal over the appropriated trunk outgoing to the supervisory unit to be used for the call. Receipt of the forward hold signal at the supervisory unit results in the application of a backward hold signal to the trunk incoming from the secondary unit switch and the repetition of the forward hold signal to the trunk outgoing from the supervisory unit in the direction of the called subscriber. Receipt of the backward hold signal in the secondary unit switch associated with the calling subscriber causes the forward hold pulse to be, in effect, locked within the delay lines associated with the modem to which the outgoing trunk to the supervisory unit is associated and all trunk marking and pulse selecting equipment used in setting up the connection so far is released. At the same time the backward hold signal in the form of the selected pulse is passed back from the secondary unit switch to the primary unit switch over the "return" communication pulse path of the appropriate link pulse highway to complete the connection from the register via the primary unit switch to this secondary unit switch. At the secondary unit switch on the other side of the supervisory unit, i. e. in the direction of the called subscriber, receipt of the forward hold signal over an incoming trunk from the supervisory unit results in the backward marking pulse, from the primary unit switch associated with the called subscriber and which as previously described has been appropriated for the call by this secondary unit switch, being admitted to the delay lines associated with the modems connected to the said incoming trunk, and in its transmission as a forward hold signal over the "return" communication pulse path of the link pulse highway connecting this secondary unit switch to the primary unit switch with which the called subscriber is associated.

The calling and called subscribers may of course be connected to the same primary unit switch in which case the backward hold signal appertaining to the first stage of the connection and the forward hold signal appertaining to the second stage of the connection will both arrive over the "return" communication pulse paths of their respective pulse highways and these signals are differentiated by the different positions in the TDM cycle which the pulses conveying the signals necessarily occupy as a result of the gating arrangements in the various pulse highways.

At the primary switch associated with the called subscriber, receipt over the "return" communication pulse path from the secondary switch of a pulse which is coincident with one which this primary switch is transmitting as a backward marking signal indicates to the primary switch that this is the pulse to be used in the connection to the secondary switch, and accordingly this pulse is stored in the delay lines associated with the called subscriber's modem and the common equipment used in setting up the connection is released. As each switch in the path between the calling and called subscriber releases its common equipment a "switch connected" signal is passed to the exchange marker. The exchange marker counts these signals and when it has received the number appropriate to the call (four in this case) it knows that the wanted path has been established and it thereupon releases.

A path has now been established from the calling subscriber to the register using one pulse train of the communication TDM system, and from the register to the called subscriber, this latter connection using the same or another pulse train of the communication TDM system and including a supervisory circuit individual to the call from which ringing and metering are controlled.

In this embodiment, metering and ringing are controlled by tone signals transmitted from the supervisory circuit to the calling and called subscriber's line circuits respectively, the supervisory circuit being arranged to transmit a tone ringing signal to the called subscriber immediately subsequent to the transmission of the forward hold signal thereto as previously described. Receipt of the tone ringing signal at the called subscriber's line circuit results in the transmission of ringing current to ring the called subscriber's bell. Simultaneously with the transmission of the tone ringing signal, a ringing tone signal is returned in the direction of the calling subscriber. This signal is detected by the register, from which the connection to the supervisory circuit has been set up, and indicates to the register that the called subscriber is not busy, and the register thereby knows that it may release. In doing so, the register drops the TDM pulse used in the original connection between itself and the calling subscriber and establishes a through communication path between the calling and called subscriber.

Meanwhile, at the called subscriber's line circuit ringing is being applied to the line and as later described this results in an intermittent backward hold signal being passed back to the supervisory circuit. When the called subscriber eventually answers, the looping of his line wires results in the backward hold signal becoming steady. At the supervisory circuit the conversion of the backward hold signal from an intermittent to a steady signal is an indication that the called subscriber has answered and transmission of the tone ringing and ringing tone signals is terminated and a short burst of metering tone signal is transmitted to the calling subscriber's line circuit to operate his meter. So long as the backward hold signal from the called subscriber's line circuit and the forward hold signal from the calling subscriber's line circuit are maintained, the TDM pulses used in the connection continue to circulate in the delay lines associated with the modems in the various switches over which the communication path was established and the connection is released by removal of these signals when the subscribers clear.

The case of junction calls will now be considered. Incoming junctions are connected to the selector sides of primary unit switches via incoming junction relay sets, and outgoing junctions are connected to the selector sides of secondary unit switches via outgoing junction relay sets. These junction relay sets includes hybrid transformers for effecting conversion from the four wire transmission within the exchange to the two wire junction lines, and various relays for impulse repetition and for providing the various signals required by this exchange system. In these relay sets relays have been used merely for ease of explanation and could readily be replaced by circuits using electronic devices in place of relays. The general operation of the circuits for junction calls is similar to that already described above for subscriber to subscriber calls. If an incoming junction call is being set up, a register will be taken into use by the primary unit switch to which the incoming junction is connected and the wanted subscriber's line connected to the same or another primary unit switch will be backwardly marked by the exchange marker. If on the other hand an outgoing junction call is being set up, a register will be taken into use by the primary unit switch concerned and the wanted junction will be marked, by a backward marking applied directly to the appropriate outlet(s) of the secondary unit switch to which the outgoing junction or group of junctions required is connected.

In the case of a connection between an incoming junction and an outgoing junction, i. e. where the exchange is required to operate in a tandem capacity, the primary unit switch to which the incoming junction is connected takes a register into use and backward marking signals are applied to the appropriate outlet(s) of the secondary unit switch to which the outgoing junction or group of junctions required is connected.

Before going on to describe the system in greater detail, a digression will now be made to describe in outline the delay line storage arrangements used in this system and reference should now be made to Figs. 2 and 2a of the drawings.

The delay lines which are used in the primary and secondary unit switches are preferably of the ultrasonic liquid filled type. These usually comprise a steel tube filled with mercury with a quartz crystal transducer at each end. Such delay lines are now familiar to workers in many fields and particularly to those engaged on computor systems. The principle of operation of a delay line storage system is that if a pulse is applied at the transmitting end of a delay line, it will be reproduced at the receiving end after some delay and may therefore be considered as having been remembered for this time interval. If, as is usually the case, it is desired to remember the presence of the input pulse for a longer period, the output of the delay line can be fed back into the input so that the pulse circulates round the circuit and the period of memory is increased indefinitely. It is, of course, necessary to make up for any attenuation in the delay line, for example, by means of an external amplifier and to provide pulse re-shaping circuits so that the inevitable distortion of the pulse shape is corrected at every circulation.

The main elements which comprise a delay line circulation system are shown in Fig. 2. A pulse trigger PT applies a substantially rectangular pulse to the delay line DL. The output pulse from the delay line passes through an amplifier A to make up the attenuation due to the delay line and is then applied to gate G2. Gate G2 is operated by a train of clock pulses the pulses of which are of short duration and coincide with the centre of each pulse from the output of the delay line thus causing gate G2 to produce a short output pulse, the timing of which is accurately determined by the short coincident clock pulse. The short output pulse from gate G2 triggers the pulse trigger PT which generates a longer rectangular pulse that is again fed into the delay line. In this way the circulation of the pulse is maintained, the pulse being re-timed at gate G2 and re-shaped by the pulse trigger each time it passes through the delay line. The pulse trigger which drives the delay line can also provide output pulses, thus indicating the pulses which are stored in the circulating system. Gate G1 is provided to enable additional pulses to be fed into the system. Gate G3 is provided to control the circulation. If gate G3 is open at the time by the presence of a coincident pulse over the "maintain" lead a pulse is applied to it, the pulse will pass through and thus continue circulating, but if this gate is closed, due to the absence of a coincident pulse on the "maintain" lead, when a pulse is applied to it, the circulating path is broken and the pulse removed from storage.

Fuller details of a mercury delay line storage system as outlined above are contained in Paper No. 1527 of the Proceeding of the Institution of Electrical Engineers, part II number 76 August 1953, entitled "The Mercury Delay-Line Storage System of the ACE Pilot Model Electronic Computor" by E. A. Newman, D. O. Clayden, and M. A. Wright.

In one known telephone system employing electronic selecting switches a delay line storage arrangement is associated with each trunk to remember the pulse to be used in the modulator-demodulator pair of the trunk. A more economical way of applying delay line storage is to associate a small common group of delay lines with a large group of individual trunks. Each delay line can then use its full storage capacity (e. g. 100 pulses) instead of storing only a single pulse as in the said known arrangement. When a common store is used, the store has to remember not only the pulses in use but also with which trunk each pulse is associated. The method of doing this is shown in Fig. 2a. In this figure each modulator-demodulator pair (modem) is arranged to operate only when it receives coincident pulses from the two delay lines to which it is connected and each modem is connected to a different pair of delay lines. Thus, a particular pulse will only operate the modem of trunk No. 1 if it is circulating in delay lines DL1 and DL2, a pulse will only operate the modem of trunk No. 2 if it is in delay lines DL1 and DL3 and it will only operate the modem of trunk No. 3 if it is in delay lines DL2 and DL3. When a pulse, selected by a master selector, is to be associated with a particular trunk, the trunk marker marks the two delay lines associated with that trunk. Thus, when the master selector generates on lead 1 a pulse which is to be associated with the modem of trunk No. 1, the trunk marker applies potentials on leads 2 and 3 to open gates G4 and G5 and admit the pulse to delay lines DL1 and DL2. The pulse will circulate in these delay lines for as long as the gates G1 and G2 are opened by a coincident pulse on lead 5. Lead 5 must therefore carry all the pulses to be kept in the store. This is arranged by connecting the lead to a common highway associated with the modems. Storage of the pulse associated with a trunk then depends on the presence of the forward or backward hold signal on the trunk.

The arrangements for re-timing and re-shaping the circulating pulses have been omitted from Fig. 2a and from the subsequent figures of the accompanying drawings. The simple example shown in Fig. 2a uses combination of 2 out of 3 delay lines to store the pulses for 3 trunks and shows no economy over the use of delay lines individual to the trunks. However, for larger numbers of trunks a considerable economy is achieved. For example, 15 delay lines, used in pairs, can store the pulses for 105 trunks. If 15 delay lines are used in combinations of 3 they can store the pulses for 455 trunks.

Turning now to the more detailed circuits reference will first be had to the subscriber's line circuit illustrated in Fig. 3. The line circuit includes a hybrid transformer TA1, a ringing transformer TA2, a tone ringing transformer TA3 and a metering tone transformer TA4. Transformer TA1 connects the subscriber's line pair SL shown at the left of the figure to the four-wire transmission system indicated by the "Go" and "Return" pairs shown at the right of the figure. The ringing transformer TA2 has a primary winding connected in the anode circuit of a cold cathode tube VA1 which is connected to a source of 100 volts positive D. C. potential on which is superimposed 17 cycles per second ringing current from source RC, and secondary windings connected in the battery and earth feed to the subscriber's line. The tone ringing transformer TA3 has two primary windings connected in the "Return" path and shunted by condensers CA2 and CA3 to tune them to the tone ringing signal, a first secondary winding TA3A connected between a source of 50 volts positive D. C. potential and the striker electrode of tube VA1 and a second secondary winding TA3B connected between a source of 10 volts negative D. C. potential and the forward hold wire FH. This connection includes rectifier MRA1, and the winding TA3B and the rectifier are shunted by a smoothing condenser CA1. The transformer TA4 also has two primary windings connected in the "Return" path and tuned by shunting condensers CA4 and CA5 to the metering tone and a secondary winding connected between a source of 50 volts positive D. C. potential and the striker electrode of a second cold cathode tube VA2. Also bridged across the "Return" path is an acceptor circuit comprising the inductance L and capacitance C tuned to the metering tone frequency to exclude this from the local speech path. The anode of tube VA2 is connected to a source of 100 volts positive D. C. potential on which is superimposed 50 cycles per second alternating current from the source A. C. and the cathode of the tube is connected to earth over the subscriber's meter SM which is shunted by condenser CA6 to provide a path for the alternating current. Current is fed to the subscriber's line over resistors RA1 and RA2, the former being connected to earth and the latter to a source of 50 volts negative D. C. potential in the normal manner. The unearthed end of resistor RA1 is connected to the forward hold wire FH. A line balance LB is connected to the transformer TA1.

When a call is initiated, the line wires are looped in the usual way and current flows from earth, through resistor RA1, secondary winding of transformer TA2, lower half primary winding of transformer TA1, the subscriber's loop, upper half of transformer TA1, left hand secondary winding of transformer TA2, resistor RA2 to 50 v. negative battery. Due to the flow of current in the above traced circuit a drop of potential takes place across resistor RA1 resulting in the application of a potential of −10 v. on wire FH as a forward hold signal to register the calling condition in the associated primary unit switch. The tone ringing transformer TA3 is also made ineffective since the potential developed across resistor RA1 removes the bias from rectifier MRA1 allowing it to pass current through the secondary winding TA3B of transformer TA3, thereby effectively short-circuiting the transformer.

When a call is set up to this line circuit the tone ringing signal is detected by the transformer TA3 which brings about the ringing of the subscriber's bell in the following manner.

The positive half-cycle of the received tone ringing signal developed across the secondary winding TA3A of the transformer TA3 superimposed on the 50 volts D. C. is applied to the striker electrode of cold cathode discharge tube VA1, causing the tube to strike. The tube fires during the positive half cycles of the 17 C. P. S. supply connected in its anode circuit over the primary winding of transformer TA2 and supplies sufficient power to ring the subscriber's bell. During each pulse of ringing current a potential of approximately −10 v. is developed across the resistor RA1 and applied to the wire RH as an intermittent backward hold signal which is used as a ringing check signal in the supervisory circuit, as later described.

Upon the reply of the subscriber, a steady loop current flows through the resistor RA1 with the result that the intermittent backward hold signal becomes steady, thus indicating to the preceding circuits that the called subscriber has replied. At the same time the rectifier MRA1 is allowed to conduct, thereby short circuiting transformer TA3 as previously described.

The meter is operated in a similar manner by a metering tone signal which is detected by the transformer TA4, the primary windings of which are tuned to the tone frequency by the condensers CA4 and CA5, and applied to the striker electrode of the cold cathode discharge tube VA2. The metering tone signal is of short duration (approximately 1 second). The tube VA2 conducts during each positive half cycle of the 50 C. P. S. supply in its anode circuit, but due to the condenser CA6 shunting the meter, the meter holds to pulsating anode current until the tube is finally extinguished by removal of the metering tone signal.

The line circuit of Fig. 3 is directly connected to one of the modems of the group of modems contained in a primary unit switch such as is shown by the functional diagrams of Figs. 4 and 5. In these functional diagrams, wires carrying audio frequency speech currents or direct currents are represented by full lines, while those wires which carry TDM current pulses, modulated by audio frequency speech currents or unmodulated are represented by dotted lines. The "Go" speech wires and the wire FH are both terminated at the pulse modulating gate represented by the rectangle PGA. It should be appreciated that the D. C. potential which is present on wire FH when a subscriber's hand set is lifted constitutes the forward hold signal in the case of a calling subscriber and the backward hold signal in the case of a called subscriber. The "Return" speech wires are terminated at the pulse demodulating gate represented by the rectangle PGB. Also extended from the pulse demodulating gate PGB is a wire 418, but no connection is made to this lead from the subscriber's line circuit.

For the identification of the subscribers' lines served by a primary unit switch such as that represented by Figs. 4 and 5, an identification time division multiplex system is provided. This identification TDM does not provide speech channels and a low recurrence frequency with a large number of pulses per cycle can be used. In the proposed arrangements the identification TDM cycle provides 1000 separate pulses per cycle, and a particular pulse in the cycle is permanently associated with a particular line circuit served by the switch. Three multiplex circuits indicated by the triangles PMX1, PMX2, and PMX3 shown in Fig. 4 are provided. Each multiplex has a separate D. C. input wire corresponding to each line or line circuit and each of the three multiplexes has a single output pulse wire, over which are passed identification TDM pulses, whose time positions in the cycle correspond to the input wires upon which a signal condition is present. Of the three multiplex circuits shown, PMX1 serves to enable a line circuit to be marked from the exchange marker circuit; PMX2 serves to enable a calling line circuit to be identified, and PMX3 serves to mark the busy condition of a subscriber already engaged on a call.

Besides the multiplex circuits above mentioned a primary unit switch includes a group of delay lines of which only two, designated PDL1 and PDL2, are shown and which serve to control the modems contained in the primary unit switch. Two other delay lines designated PDL3 and PDL4 are also included and are associated with the pulse highways linking the primary unit switch with the register switch. In addition the primary unit switch includes trunk markers PTM1 and PTM2, a master selector PMS, admittance and co-incidence gates PG1 to PG37, inhibiting gates PI1 to PI4 and pulse lengtheners PL1—PL7. The register switch circuit (Figs. 9 and 10) includes multiplex circuits SMX and RMX, a switch marker SM, a master selector MSP, a register marker RM, two groups of delay lines of which the two designated RDL1 and RDL2 belong to one group and the two designated RDL3 and RDL4 belong to the other group. A group of demodulating gates of which only the pair RGA and RGC are shown and a group of modulating gates of which only the pair RGB and RGD are shown, admittance and co-incidence gates RG1—RG9 and RGE, inhibiting gate RI1 and pulse lengthener RL1. The secondary unit switch (Figs. 6, 7 and 8) includes multiplex circuits SMX1—SMX4, trunk markers STM1 and STM2, master selector SMS, admittance and co-incidence gates SG1—SG20, inhibiting gates SI1, SI2 and SI3, a group of modulating and demodulating gates, of which only the modulating gate SGA and the demodulating gate SGB are shown, and which are associated with a group of audio frequency trunks such as SBU over which connections are established in an outgoing direction towards a required destination, a group of delay lines of which only two, SDL3 and SDL4 are shown and which serve to control these modulating and demodulating gates. A further group of modulating and demodulating gates, of which only the modulating gate SGD and the demodulating gate SGC are shown and which are associated with a group of audio frequency trunks such as SRU, over which connections are established in the direction of the called subscriber and a further group of delay lines of which only two, SDL1 and SDL2 are shown and which serve to control this further group of modulating and demodulating gate circuits.

The operation of the circuits shown in Figs. 4, 5, 9 and 10 will now be described. Each subscriber's line terminates on a pair of gates such as PGA and PGB and the forward hold signal lead also terminates on the modulating gate PGA and has a branch connected to the calling line identification multiplex PMX2. The backward marking signal lead from the exchange marker is connected to the called line identification multiplex PMX1. Forward hold and backward marking signal wires associated with other lines connected to the primary unit switch are similarly connected to the multiplex circuits mentioned. Apart from the modulating and demodulating gates PGA and PGB and the incoming line wires all the apparatus and circuits shown are available in common to all the lines connected to the primary unit switch.

When a subscriber served by the primary unit switch illustrated in Figs. 4 and 5 originates a call and loops his line wires by removal of his receiver a forward hold signal will appear on the lead FH incoming to the left of Fig. 4. This signal is applied via lead 400 to prepare the modulator gate circuit PGA and via lead 401 to the identification multiplex circuit PMX2 which is thereby caused to generate the pulse corresponding to the calling line circuit on its output pulse highway 402. Similarly, should other line circuits connected to the same primary unit switch also be calling at the same time, the identification pulses corresponding to these line circuits will also appear on the pulse highway 402 and will be passed via the inhibiting gate PI1 to the pulse highway 403. Pulses representing subscribers already engaged, applied to gate PI1 by the multiplex circuit PMX3 will be inhibited so that only pulses of calling lines will be allowed to reach the highway 403. The pulses on lead 403 are applied via lead 404 to the inhibiting gate PI2 to inhibit the pulses of calling lines, and also via lead 405 to the trunk marker circuit PTM1. This latter circuit has a single input pulse lead and a plurality of pairs of output leads, one pair for each of the pairs of delay line circuits in the group of delay lines serving this switch and is arranged to effect a selection of one of the calling pulses applied to it over the input pulse wire 405 and in response thereto to apply a D. C. marking potential to the pair of output leads corresponding to the pair of delay line circuits associated with the modems of the selected line, the D. C. markings being passed in this instance over the leads 406a and 406b to the "coincidence of two" gate circuits PG1 and PG2. The presence of identification pulses on lead 403 also causes the pulse lengthener PL1 to operate and produce a D. C. potential on lead 407, which is connected to the "coincidence of three" gate PG3. This gate has also applied to it a train of clock pulses over terminal K, the pulses of which train coincide in turn with every pulse of the communication TDM system, a D. C. operating signal over lead 408 from the trunk marker PTM1 and also over inhibiting leads 409 and 915 all the pulses which are already in use in this switch and the register switch (Figs. 9 and 10).

The simultaneous presence of D. C. on leads 407 and 408 therefore causes all the pulses suitable for use in providing a communication channel between the calling line and the register to appear on lead 411. The pulses on lead 411 operate the pulse lengthener PL2 which produces on its output lead 412 a D. C. potential which is applied to a primary unit switch marking element PSM associated with the register switch in Fig. 9. This marking element PSM comprises a multiplex SMX and a switch marking circuit SM, the latter circuit having an input pulse highway 901 and a plurality of output leads, only one of which, lead 900, is shown, there being one output lead corresponding to each pulse in the cycle of the multiplex SMX. The multiplex circuit SMX has connected to it a lead, corresponding to lead 412, from each of the primary unit switches served by the register switch, and thus receives a calling signal from each primary unit switch which has calling lines and available pulses, in the form of a D. C. potential on the appropriate leads corresponding to lead 412. Receipt of D. C. marking potentials over any of the leads like 412 causes the multiplex circuit SMX to produce the corresponding pulses on its output pulse highway 901. The marking circuit SM makes a "one only" selection of one of these pulses and applies a D. C. marking potential to the corresponding output lead 900 to mark the selected primary unit switch.

Assuming that the primary unit switch selected is that shown in Figs. 4 and 5, the D. C. potential on lead 900 is applied to the "coincidence of two" gate circuits PG4 and PG5. This D. C potential opens gate circuit PG4 and admits to lead 413 all the pulses which are not inhibited at gate circuit PG3. These pulses pass into the register switch via the primary unit switch common PC1, lead 902, to the master selector MSP which selects one of the pulses on lead 902 and reproduces the selected pulse on its output lead 903. The presence of pulses on lead 902 also operates the pulse lengthener circuit RL1 causing it to produce a D. C. potential on its output lead 904. This potential is fed, via the register switch common RC1 and lead 905 to inhibiting gate circuit RI1. There is one inhibiting gate circuit, such as RI1, for each register in the group of registers to which the register switch has access. Each inhibiting gate circuit RI1 is connected to its associated register, by two inhibiting leads such as 906 and 907 so that the D. C. marking potential from lead 904 is prevented from passing through those gates the associated registers of which are already engaged, but is allowed to pass through those gates the associated registers of which are free, and appears on the leads 908 from these gate circuits. The output leads 908 are connected to a register selecting circuit element RSM similar to the primary unit switch marking element PSM previously mentioned, i. e. the output leads 908 feed into a multiplex circuit RMX the pulse output highway 909 of which is connected to a register marker circuit RM. The application of marking potential to the leads 908 corresponding to the free registers results in pulses corresponding to these leads appearing on the output pulse highway 909 from the multiplex RMX and the register marker circuit makes a "one only" selection among these pulses and produces a D. C. potential on a pair of output leads such as 910a and 910b, this D. C. potential being applied to the pair of delay lines corresponding to the selected register. The output leads 910a and 910b from the register marker RM are connected to gate circuits RG1 and RG2 respectively, thus opening these gates and allowing the selected pulse on lead 903 to pass via the common RC2 into the pair of delay lines RDL1 and RDL2 associated with the selected free register.

The pulse on lead 903 also passes over lead 911 and via primary unit switch common PC2 to the selected primary unit switch where in the presence of the D. C. marking potential on lead 900 it passes through gate circuit PG5 into the delay line PDL3 associated with the pulse highway between the register and the selected primary unit switch. The same pulse also passes to the pair of delay lines PDL1 and PDL2 associated with the calling line via gate circuits PG1 and PG2, which are opened by the D. C. marking potentials on leads 406a and 406b, and also via lead 900a to the inhibiting gates P13 and P14 temporarily preventing any premature pulse from gate PGA passing over the link pulse highway. The coincident output pulses produced by delay lines PDL1 and PDL2 are applied to the pulse modulating and demodulating gate circuits PGA and PGB causing these to operate. The modulating gate circuit PGA is receiving the forward hold signal on lead 400 and this signal is therefore modulated by the gate circuit PGA thus causing a pulse coincident with that stored in the delay line pair to be produced on the pulse highway 414, and fed via lead 500 (Fig. 5) to gate circuit PG6. The pulse from the output of delay line PDL3 is also applied to gate PG6 via lead 415 and the coincidence of these two pulses at this gate opens it to allow the pulse on lead 500 to pass through via the primary unit switch common PC4, lead 100 and register switch common RC4 to the register switch demodulating gate circuit RGA. Since gate RGA has applied to it the output pulses from the delay lines RDL1 and RDL2 via leads 912 and 913, the pulse on lead 100 is demodulated to reproduce the D. C. forward hold signal and apply it to the register over lead PFH. Upon receipt of the forward hold signal over lead PFH the register returns a D. C. backward hold signal over lead RBH, which is applied to the modulating gate RGB. This gate is also receiving the coincident pulses from the delay lines RDL1 and RDL2 and it therefore operates on receipt of the backward hold signal to produce on leads 101, 102 and 914 a pulse corresponding to that on lead 100. The pulse on lead 914 (Fig. 9) opens the maintaining gates RG3 and RG4 to complete the circulation paths for the delay lines RDL1 and RDL2. The same pulse passes via gate RG5 and over inhibiting lead 915 to the gates PG3 (Fig. 4) in all the primary unit switches associated with this register switch to mark the pulse engaged to other calling primary unit switches. The pulse present on lead 101 is fed over register switch common RC5 and primary unit switch common PC5 to gate PG7 (Fig. 5) and since this gate is receiving a coincident pulse from the delay line PDL3, the pulse on lead 101 passes through gate PG7 to leads 501 and 502. The presence of the pulse on lead 502 allows gate PG8 to open and complete the circulation path via gate PG9 for the pulse in the delay line PDL3. The pulse on lead 501 passes via lead 503 to gate circuit PG10 which admits it to inhibiting lead 504 to inhibit the pulses at gates PI3 and PI4 preventing its reaching highways 505 and 506. The pulse on lead 501 is also admitted by gate circuit PG11 to the pulse highway lead 416 leading to the demodulating gate PGB. The pulse on lead 507 is also admitted by gate PG14 to lead 417 and is applied to gates PG12 and PG13 thereby opening these gates to complete the circulation paths for the pulse in delay lines PDL1 and PDL2.

The demodulating gate PGB operates on receipt of the pulse on lead 416 and produces on its output side on lead 418, a backward hold signal. This backward hold signal is applied to the identification multiplex PMX3 and causes it to generate on its pulse highway 419 the identification pulse corresponding to the calling subscriber. This identification pulse is applied to the inhibiting gate circuit PI1, thus closing the gate circuit to the identification pulse from PMX2 corresponding to the calling subscriber, and consequently this pulse is removed from lead 403. Removal of the pulse from lead 403 causes the trunk marker PTM1 to release thus moving the D. C. potentials from leads 406a, 406b and 408 which results in the closing of gate circuits PG1, PG2 and PG3. Closure of the gate circuit PG3 releases the pulse lengthener PL2 and removes the calling signal from lead 412 which in turn releases the primary unit switch marking element PSM. This causes the D. C. potential to be removed from lead 900 and the absence of this potential closes gates PG4 and PG5. The pulse corresponding to the calling line from the "coincidence of three" gate PG3 is no longer present on leads 411, 413 and 902, consequently the master selector MSP is released and the pulse lengthener RL1 no longer operates. As a result of this the selected pulse from MSP is removed from lead 903 and the register selecting circuit RSM is released. Release of RSM results in the removal of the D. C. potentials from leads 910a and 910b and this results in the closure of gate circuits RG1 and RG2. The selected communication pulse remains stored in the delay lines RDL1 and RDL2 associated with the selected register, in delay lines PDL1 and PDL2 associated with the calling subscriber's line, and in delay line PDL3 associated with the communication path between the selected primary unit switch and the selected register, as long as the pulse is maintained on leads 914, 417 and 502 by the backward hold signal over lead RBH from the register, which in turn is dependent upon the continued receipt of the forward hold signal from the calling subscriber. As a result of the above described operations the communication path over leads 414, 416, 100 and 101 between the calling line and the incoming side of the register has now been completed and all the common apparatus, other than the delay lines used in setting up the path, has been released.

The register now transmits dial tone to the calling subscriber who dials the number of the wanted subscriber into the register, the loop interruptions caused by the subscriber's dial being repeated to the register as interruptions of the forward hold signal over wires FH and PFH. The register stores the digital information, performs any translations required and applies for the use of the exchange marker. As soon as the marker has become connected to the register, the register applies a D. C. "marker connected" signal to the lead MC (Fig. 10) and this signal is fed into gate RGE thus opening it and causing the pulse stored in delay lines RDL1 and RDL2 to be produced on lead 103, whence it passes to gate circuit PG15. This gate opens to it because of the coincident pulse applied to it by delay line PDL3, and the pulse is admitted to lead 508. From there it passes to leads 509 and 510 to perform functions which will be described later. The pulse is also applied to the inhibiting gates PI3 and PI4 in the pulse highway to substantiate the pulse on lead 503. When the exchange marker has received the routing information from the register it applies a backward marking signal to the called subscriber's line, or outgoing junction as required.

It will first be assumed that the calling subscriber wishes to be connected to another subscriber served by the same exchange. The called subscriber may be connected to the same primary unit switch as the calling subscriber or he may be connected to another primary unit switch either in the same frame as this primary unit switch or in another frame. Wherever the called subscriber is located the circuit action which follows is the same. It will therefore be assumed for explanation purposes that the called subscriber is connected to the same primary unit switch as that to which the calling subscriber is connected, in which case the exchange marker applies a backward marking signal to the backward marking wire BM (Fig. 4), associated with the called subscriber's line and connected to the identification multiplex circuit PMX1, which is thereby caused to produce on its pulse highway 420, the identification pulse corresponding to the called subscriber's line. This pulse is fed over lead 421 to the pulse lengthener PL3 which is thereby caused to produce on its output wire NO a D. C. signal. This signal is fed back via the exchange marker to the register to indicate that the number dialled by the calling subscriber is one which is not unobtainable. The identification pulse from PMX1 is also applied to the inhibiting gate PI2. If the called subscriber is already engaged this gate will be closed by an inhibiting pulse over lead 419 and the pulse from the multiplex PMX1 will therefore be prevented from passing through gate PI2 and will not reach the pulse lengthener PL8, thus preventing a D. C. signal being fed back via the exchange marker to the register over lead NB. In the absence of an output signal over lead NB the register assumes the called subscriber is busy and reverts busy tone to the calling subscriber. Assuming, however, that the called subscriber is free, the called subscriber's pulse will not be inhibited at gate PI2 and the backward marking identification pulse from PMX1 will pass to the pulse lengthener PL8 the D. C. output of which is applied to the lead NB to provide the signal to the register which indicates that the called subscriber is not busy. The identification pulse passing through gate PI2 is also applied via lead 424 to the trunk marker PTM2 which accordingly produces on a pair of its output leads, similar to the pair 425a and 425b, D. C. potentials which are applied to the gate circuits similar to PG16 and PG17 to prepare these for a pulse to enter a pair of delay lines similar to PDL1 and PDL2 and associated with the called subscriber's modem. The D. C. output from the pulse lengthener PL8 is also fed over lead 422 to the gate PG37 (Fig. 5). This gate has applied to it all the communication TDM pulses from the source of clock pulse over terminal KK and also, over inhibiting lead 423 and gate PG31, all the TDM pulses which are already stored in the group of delay lines of which PDL1 and PDL2 form a pair, i. e. all the TDM pulses which are already stored in the group of delay lines of which PDL1 and PDL2 form a pair, i. e. all the TDM pulses which are already in use in the primary unit switch. If the calling subscriber is connected to this switch these latter pulses will include the pulse used to connect the calling subscriber to the register. Gate PG37 therefore applies as backward marking pulses over lead 511 all the communication TDM pulses which are available for providing communication channels to the secondary unit switches on the other side of the frame.

The primary unit switches are connected by separate link pulse highways to each of the secondary unit switches on the other side of the frame. Each link pulse highway comprises four physical links, two for "go" and "return" speech, one for "go" backward marking signals and one for "return" backward mark signals. The link pulse highways are terminated at each end on four gate circuits such as the gate circuits PG18 to PG21 (Fig. 5)

and the gate circuits SG17 to SG20 (Fig. 6). Each group of gates has applied to it gating pulses from a group pulse source such as P(XYZ) Figs. 5 and 6, the same group pulse source being applied to the groups of gates at either end of the same link pulse highway. The backward marking pulses on lead 511 are thus distributed over the link pulse highways to which they appertain. For the sake of this description it will be assumed that some of the backward marking pulses belong to the group XYZ and are accordingly transmitted over the link pulse highway connecting this primary unit switch with the secondary unit switch shown in Figs. 6, 7 and 8 which also is arranged for the pulse group XYZ.

On arrival at the secondary unit switch of Figs. 6, 7 and 8 the pulses on lead GBM pass through gate SG18 (Fig. 6) due to the coincidence of these pulses with the appropriate pulses of the XYZ group and via lead 600 to the master selector SMS which makes a "one only" selection among the pulses and produces the selected pulse on its output lead 601. The master selector SMS also applies a D. C. "connected" signal over wire EM1 to the exchange marker to indicate that the call has been established to this stage. The pulses through gate SG18 are also applied via lead 602 to the pulse lengthener circuit SL1 causing it to produce a D. C. potential on its output lead 603, this potential forming the backward marking signal which is applied via the lead 700, commoned at BMC to the backward marking leads, there being one backward marking lead included in each trunk such as SRU and the inhibiting gate circuits SI3 connected to these leads, to the backward marking leads BM1 of all free trunks, such as SRU each of which is connected to a different supervisory circuit (described later in connection with Fig. 11). Those trunks which are already engaged will be in receipt of a forward hold signal over lead FH1 from the associated supervisory circuit, which inhibits the gate circuits SI3 of the corresponding backward marking leads, and thereby blocks the passage of the backward marking signal on these leads.

From the free supervisory units, the backward marking is extended to other secondary unit switches in this and other frames. Assuming now that the secondary unit switch shown in Figs. 6, 7 and 8 is one of these other secondary unit switches which is being backwardly marked by one or more of these free supervisory units. The backward markings appear at this secondary unit switch, on leads such as BM2 of the trunk SBU shown in Fig. 8 one lead BM2 being provided individual to each trunk such as SBU. Receipt of backward marking signals over leads BM2 causes the identification multiplex circuit SMX1 in the secondary unit switch to which the leads BM2 are connected, to produce the identification pulses corresponding to the backwardly marked trunks on its pulse highway 810 where they are fed via inhibiting gate circuit SI1 and lead 800 to the trunk marker circuit STM1 and also to the pulse lengthener SL4. The trunk marker STM1 on receipt of the identification pulses makes a "one only" selection among them and produces D. C. gating potentials on a pair of its output leads such as 802, 803 which are applied to gate circuits SG1 and SG2 associated with the pair of delay lines SDL3 and SDL4 allocated to the trunk corresponding to the identification pulse selected by the trunk marker, in readiness for the receipt of the communication pulse to be used to operate the modems of the trunk as later described.

The D. C. potential from the pulse lengthener SL4 is applied over lead 801 to the inhibiting gate circuit SG3 (Fig. 6). This gate circuit has also applied to it, all the pulses of the communication TDM system from the source of clock pulses over lead KS and, over inhibiting leads 604 and 701 all the communication TDM pulses already in use in this secondary switch. The gate circuit SG3 thus produces on its output lead 605 all the communication TDM pulses which are available for use in this switch, and these pulses are passed via gate circuits such as SG19 over the "return" backward marking leads such as RBM of the link pulse highways linking this secondary unit switch with the primary unit switches on the other side of the frame in the direction of the calling subscriber.

It will be appreciated that similar backwardly marked highways to that outlined above will also be extended to the primary unit switch from other secondary unit switches. Thus at the primary unit switch backward marking pulses will arrive over the leads such as RBM (Fig. 5) of all pulse groups having available pulses and these pulses will be admitted by gates such as PG19 to lead 512 over which they pass to gate PG22. Gate circuit PG22 has also applied to it over inhibiting lead 513 all the communication TDM pulses which are already in use in the primary unit switch and over inhibiting lead 426 all the communication TDM pulses in use in the register switch. The pulse selected for connecting the calling line to the register, it will be remembered, is present on lead 508. This pulse operates pulse lengthener PL4 thus producing a D. C. gating potential on its output lead 514 which is applied to gate circuit PG22, to open it for all the pulses which are free in both the primary unit switch and the register switch, to permit these pulses to pass over lead 515 to the master selector circuit PMS. Further, although the pulse on lead 508 used to effect connection between the calling subscriber and the register will have been inhibited at gate PG22, since this latter connection is only a temporary one, this pulse if present among those incoming over lead 512 may be included with those applied to the master selector PMS over lead 515. This is achieved by applying the pulse from lead 508 via lead 509 to the "co-incidence of two" gate PG23 which opens in the presence of a co-incident pulse on lead 512 to admit the pulse to lead 515.

The master selector PMS selects one of the pulses applied to it and re-produces the selected pulse on its output lead 516 and at the same time passes a positive D. C. signal over wire EM2 to the exchange marker to indicate that this master selector has completed its function. As will appear from the description which follows, the route through the exchange over which the call will be completed depends on the group to which the selected pulse belongs, and for the sake of this description it will be assumed that the selected pulse belongs to the group XYZ. The selected pulse on lead 516 is passed over lead 517 to a group of delay line input gate circuits via a pair of which, i. e. gate circuits PG24 and PG25 it is stored in the same pair of delay lines as that in which the calling subscriber's pulse is already stored, e. g. delay lines PDL1 and PDL2. The gates PG24 and PG25 are opened by the receipt thereat of D. C. gating potentials from the outputs of the pulse lengthener circuits PL5 and PL6, the input pulses to which are received from the gate circuits PG26 and PG27 which in turn are opened by the coincident receipt of the calling subscriber's pulse already circulating in the delay line pair PDL1 and PDL2 and the same pulse which is applied to the gate circuits PG26 and PG27 from lead 508 via lead 510. The selected pulse on lead 516 is also fed via lead 517a to the inhibiting gate circuits P13 and P14 to inhibit this pulse temporarily until a similar pulse is applied to the gates from the register. The selected XYZ pulse on lead 516 is also applied via lead 518 and admitted by gate circuit PG28 to the delay line PDL4 and also via primary unit switch common PC9, lead 104 and register switch common RC10 to the group of gate circuits associated with the delay lines on the outgoing side of the registers. Due to the presence of the "marker connected" potential on lead MC from the register in use on this call, the pair of gate circuits RG6 and RG7 associated with this register open on receipt of tthe selected pulse on lead 104 to allow this pulse to be stored in the delay line pair RDL3 and RDL4, which control the modem gate circuits RGC and RGD.

The register is arranged so that in addition to the "marker connected" signal MC it also applies a so-called register forward hold signal over wire RFH to the modulator gate circuit RGD. The register forward hold signal is a D. C. potential of —10 v. and on receipt of the coincident output pulses from the delay line pair RDL3 and RDL4 the modulator gate circuit RGD modulates the signal and produces on its output lead 105 a pulse of the group XYZ coinciding with the pulse stored in these delay lines. The XYZ pulse on lead 105 is fed via lead 106 to open the gate circuits RG8 and RG9 to complete the circulation path for the pulse in the delay lines RDL3 and RDL4. The pulse on lead 105 is also applied via lead 107, gate circuit RG5 and lead 915 to inhibit this pulse at gate circuit PG3 (Fig. 4), and also over lead 426 to inhibit the same pulse at gate PG22 (Fig. 5).

The pulse on lead 105 (Fig. 10) is also applied, via primary unit switch common PC8 and gate circuit PG29 which is opened by the coincident pulse from the delay line PDL4 to lead 519 (Fig. 5). This pulse is applied via lead 520 to the gate circuit PG30 to maintain the pulse in circulation in the delay line circuit PDL4 and via lead 521, gate circuit PG14 and lead 417 to open the pair of gates PG12 and PG13 to this pulse and thus maintain its circulation in the delay lines PDL1 and PDL2 and also via lead 522 and gate circuit PG10 to inhibit this pulse at the gates PI3 and PI4. The pulse will also reach gate circuit PG37 via gate circuit PG31 and lead 423 where it will be inhibited. In addition, the (XYZ) pulse on lead 519 is passed via the one-way gate PG36 and the XYZ group pulse gate circuit PG21 over the "go" speech wire of the link pulse highway to the secondary unit switch on the calling side shown in Figs. 6, 7 and 8, the pulse serving as a forward hold signal to this switch.

The XYZ pulse selected by the master selector PMS (Fig. 5) has now been stored in the delay line circuits associated with, (a), the calling subscriber's line, (b) the trunk associated with the outgoing side of the register connected to the primary unit switch to which the calling subscriber is connected and (c) the trunk between the outgoing side of the register and the incoming secondary unit switch.

On arrival at the secondary unit switch, the pulse on the "go" speech wire via gate PG21 passes via the XYZ group pulse gate circuit SG17 to gate circuit SG4. This latter gate circuit also has applied to it over lead 605 all the TDM pulses which this switch is transmitting as backward marking pulses over the lead RBM. The pulse from the primary unit switch coincides with its corresponding backward marking pulse and is thus allowed to pass through the gate circuit SG4 to lead 606. From lead 606 the pulse is applied to the pulse lengthener circuit SL2 to provide a "selector connected" signal over wire EM3 to the exchange marker circuit, and to the group of delay line input gate circuits associated with the delay line group serving the trunks such as SBU outgoing from this switch. It will be recalled that as a result of the backward marking of certain of these trunks from other secondary unit switches, the trunk marker circuit STM1 (Fig. 8) has in effect appropriated a trunk SBU for use on the call and has applied gating potentials via a pair of its output leads 802 and 803 to the pair of delay line input gate circuits SG1 and SG2. The pulse on lead 606 is accordingly permitted to pass through these gate circuits of the pair of delay lines associated with the modems of the appropriated trunk.

The forward hold pulse from gate SG17 is applied via leads 607 and 702 to the de-modulating gate circuit SGB, which, being in receipt of coincident pulses from its associated pair of delay lines, de-modulates the pulse on lead 702 and passes a D. C. forward hold signal over lead 703 of the appropriated outgoing trunk SBU to the supervisory circuit associated therewith.

The forward hold signal is applied over the trunk to the supervisory circuit (Fig. 11). On receipt of this forward hold signal the supervisory circuit returns a D. C. backward hold signal over the backward hold lead BH2 of the trunk SBU from the secondary switch in the calling path and, also extends a forward hold signal over lead FH1 to its associated secondary unit switch towards the called subscriber as will hereinafter be explained. The D. C. backward hold signal on lead BH2 initiates operation of the identification multiplex circuit SMX2 upon whose output pulse highway the pulse corresponding to the trunk SBU is generated. This pulse is applied to the inhibiting gate circuit SI1 to inhibit this pulse to the trunk thus marking it engaged and releasing the trunk marker STM1.

The D. C. backward hold signal is also applied over lead 804 to the modulating gate circuit SGA, causing it to operate and produce on lead 704 a pulse corresponding to the coincident YXZ pulse applied to it by the delay line pair SDL3 and SDL4. This pulse is fed via lead 704, to the pulse highway 705 whence it is fed over lead 706 to the pair of gate circuits SG5 and SG6 to complete the circulation paths for the delay line pair SDL3 and SDL4, the gates being opened by the coincident pulses from the output of the delay lines themselves. From the pulse highway 705, the XYZ pulse is also fed via gate circuit SG20 and over the associated link pulse highway back to the primary switch, in the direction of the calling subscriber. The pulse is admitted to the primary unit switch by the XYZ group pulse gate circuit PG20 (Fig. 5) and passes via lead 523, gate circuit PG32, which is opened by the coincident pulse previously stored in the delay line PDL4, primary unit switch common PC7, lead 108, demodulator gate circuit RGC which operates, due to the presence of the coincident pulses from the delay lines RDL3 and RDL4, to produce a D. C. backward hold signal over wire BH to the register. A communication path has now been set up between the outgoing side of the register and the supervisory unit, and ringing tone over this path when received in the register results in the release of the register. It will be recalled that the gate circuit PG37 was previously inhibited to the selected XYZ pulse and consequently gate circuit PG33 remains closed at this stage of the call.

Returning for a moment to the operations that take place at the supervisory unit, it will be recalled that coincident with the reversion of the backward hold signal in the direction of the calling subscriber this circuit also applied a forward hold signal over its trunk SRU to the secondary unit switch in the direction of the called subscriber. This secondary switch is identical with that shown in Figs. 6, 7 and 8.

It will also be appreciated that since there is only one link pulse highway from each primary unit switch to each secondary unit switch and vice versa and since the path from the outgoing side of the register to the secondary unit switch on the calling subscriber side of the supervisory circuit has been completed over the XYZ pulse group link pulse highway, and since the called subscriber side of the supervisory unit is connected to another secondary unit switch, this latter switch must be linked to the primary switch on the called subscriber side of the supervisory unit by a link pulse highway whose pulse group is other than XYZ. It will be assumed for the purpose of this description that this latter link pulse highway belongs to the pulse group PQR.

Referring to Figs. 6, 7 and 8 once more, and considering the effect of the backward marking signal, it will be assumed that the forward hold signal from the supervisory unit is received over wire FH1 of the trunk SRU whence it is applied over lead 805 to the identification multiplex circuit SMX3, which produces on its output pulse highway the identification pulse corresponding to the trunk. This identification pulse is applied via inhibiting gate circuit SI2 and lead 806, to the trunk marker circuit STM2 which selects a pair of output leads corresponding to the trunk and produces on the selected output leads 807 and 808 D. C. gating potentials which are applied to the gate circuits SG7 and SG8. It will be remembered that these gate circuits are also receiving the backward marking pulse assumed now to belong to the pulse group PQR selected by the master selector SMS and which is to provide the communication channel between this secondary unit switch and the primary unit switch on the called subscriber side of the supervisory unit, the gate circuits SG7 and SG8 are consequently opened to the selected PQR pulse from the master selector SMS and allow it to enter the delay lines SDL1 and SDL2 associated with the selected trunk SRU. The output PQR pulse from the delay lines is applied to the modems of the trunk SRU and consequently the modulating gate SGD operates to modulate the D. C. forward hold signal and produce on lead 705 a pulse corresponding to the PQR pulse stored in the delay lines SDL1 and SDL2 associated with the selected trunk. The "coincidence of two" gate circuit SG16 will also receive the pulses from the delay lines SDL1 and SDL2, thus causing its output pulse to operate the pulse lengthener SL3. The D. C. output from the pulse lengthener is applied, via lead 707, to the identification multiplex SMX4 which thereby produces on its output pulse highway, the identification pulse corresponding to the engaged trunk. This identification pulse is applied to the inhibiting gate circuit SI2 to inhibit this pulse thus marking the trunk SRU engaged and releasing the trunk marker STM2.

The PQR pulse is fed via the PQR gate circuit corresponding to the XYZ gate SG20 shown in Fig. 6 and over the corresponding link pulse highway to the primary unit switch to which the called subscriber is connected.

The pulse is admitted to the primary unit switch via the PQR gate circuit corresponding to the XYZ gate circuit PG20 (Fig. 5). From this gate circuit the pulse passes to gate circuit PG33, which is opened by the corresponding backward marking PQR pulse which is present on lead 511. The output pulse from gate PG33 is passed over lead 524 to the pulse lengthener circuit PL7 the output of which is passed to the marker circuit over lead EM4 as a "switch connected" signal. From lead 524 the pulse is also passed over lead 525 to the pair of delay line gates such as PG16 and PG17, which it will be recalled are already in receipt of gating potentials over leads such as 425a and 425b from the trunk marker PTM2, resulting in the pulse being stored in the pair of delay lines, such as PDL1 and PDL2, corresponding to the called subscriber.

The pulse from the output of the PQR gate circuit corresponding to PG20 also passes along the pulse highway 506, and through the inhibiting gate PI4, which it will be recalled is not inhibited to this pulse, and one way gate PG11 whence it is admitted via lead 507, gate PG14 and lead 417, to the pair of maintaining gate circuits such as PG12 and PG13 which are in receipt of gating pulses from the delay line pair associated with the called subscriber to maintain the pulse in circulation in this pair of delay lines. Also from the output of gate PG11, the pulse passes along the pulse highway 416 to the demodulating gate circuit associated with the called subscriber which is in receipt of coincident output pulses from the corresponding pair of delay lines. The pulse is accordingly demodulated and a D. C. forward hold signal is applied over a lead such as 418 to the engaging multiplex PMX3 causing it to produce on its output pulse highway an identification pulse corresponding to the called subscriber, this pulse being fed over lead 419 and inhibited at the inhibiting gates PI1 and PI2 thus marking the called subscriber engaged. A communication path has now been established between the called subscriber's line circuit to the outgoing side of the register via two secondary unit switches and a supervisory circuit. As will be described below, the supervisory unit (Fig. 11) now transmits a tone ringing signal over the communication path to the called subscriber's line circuit, and a ringing tone signal to the outgoing side of the register. As described earlier in connection with the subscriber's line circuit of Fig. 3, receipt of the tone ringing signal results in ringing being applied to the called subscriber's line and in the reversion of an interrupted backward hold signal over the forward hold lead such as 400 of the trunk linking the called subscriber's line circuit to the corresponding modem of this primary unit switch whence it is repeated over the communication path to the supervisory unit where it serves as a ringing check signal. At the register the receipt of ringing tone indicates that the called subscriber is not busy and that the register may release.

Meanwhile, the exchange marker having received four switch connected signals, one from each stage in the connection, has thereby been informed that the marked connection has been established and it is accordingly released. Release of the exchange marker causes the backward marking signals throughout the exchange to be withdrawn with the result that all master selectors and trunk markers in use are released, and the pulses used for the connection remain circulating in the various pairs of delay lines under control of the forward hold signal from the calling subscriber.

Upon release of the register the register forward and backward hold signals are removed from the pulse highways 105 and 101 respectively. Removal from lead 101 of the backward hold pulse, which it will be recalled is the pulse used in the initial stage of the connection to establish a communication path between the calling subscriber and the incoming side of the register, results in the disappearance of the maintaining pulse over lead 102 from the gates RG3 and RG4 (Fig. 9) and results in the removal of this pulse from the delay line pair RDL1 and RDL2. In addition the backward hold pulse is removed from the pulse highway 501 (Fig. 5) and lead 502 resulting in closure of the gate PG8 and the removal of the pulse from the delay line PDL3, from the lead 503 to remove the inhibition of this pulse at the inhibiting gate circuits PI3 and PI4, and from the leads 416, 507 and 417 resulting in closure of the maintaining gate circuits PG12 and PG13 to this pulse, thus removing this pulse from the delay lines associated with the calling subscriber's modem. Removal from lead 105 (Fig. 10) of the register forward hold pulse, which, it will be recalled, is the XYZ pulse used to complete the connection forward to the supervisory unit results in the removal of this pulse from lead 106 and the closure of the maintaining gates RG8 and RG9 thus removing the pulse from the delay line pair RDL3 and RDL4. In addition the forward hold pulse is removed from pulse highway 519 resulting in removal of the pulse from the maintaining gate circuit PG30 (Fig. 5) thus removing the pulse from the delay line PDL4, and in the removal of the pulse from lead 522 and gate PG10 removing the inhibition to this XYZ pulse from the inhibiting gate circuits PI3 and PI4. The XYZ pulse is also removed from lead 521 to gate PG14 but this path is immediately replaced by the path through the now open inhibiting gate PI4 and lead 507, thus maintaining the XYZ pulse in circulation in the delay lines PDL1 and PDL2. Due to the removal of the inhibition of the XYZ pulse at inhibiting gate circuits PI3 and PI4, the calling subscriber's modem has now been effectively switched through to the communication path to the secondary unit switch on the calling side of the supervisory unit, and the register forward hold pulse over high 105 which was previously applied to the XYZ group pulse gate circuit PG21 is now replaced by a similar pulse from the calling subscriber's modulating gate circuit PGA.

For a clearer understanding of the manner in which ringing and metering is controlled, reference will now be made to the supervisory circuit of Fig. 11.

The connections to the supervisory circuit comprises two sets of terminals an "In" set and an "Out" set. The trunk SBU from a set of trunk terminals on one secondary unit switch is terminated on the "In" set of terminals in the supervisory circuit and the trunk SRU connected to the "Out" set of terminals from the supervisory unit is terminated on a set of trunk terminals of a different secondary unit switch. The supervisory circuit includes three thermionic control valves VS1—VS3 and five cold-cathode gate switching discharge tubes CT1—CT5. The ringing of the called subscriber's bell is controlled by the application of a ringing control tone signal from the generator RCT to the speech path outgoing from the supervisory circuit in the direction of the called subscriber over the "Out" terminals via transformer TT1 and a gate circuit consisting of rectifier MRS1, condenser CS1 and resistor RS1.

Ringing tone from the generator RT is reverted to the calling subscriber via a gate circuit consisting of rectifier MRS2, condenser CS2 and resistor RS2, transformer TT2 and the speech path in the direction of the calling subscriber. Likewise, a tone signal generated by the generator MTC for controlling the operation of the calling subscriber's meter is applied to the latter speech path via a gate circuit comprising rectifier MRS3, condenser CS3 and resistor RS3.

In more detail the operation of the circuit is as follows. If the inhibiting gate SI3 associated with the "In" trunk terminal set of the associated secondary unit switch has permitted a backward marking signal to pass through the supervisory unit—to the "Out" trunk terminal set of the secondary unit switch associated therewith, the supervisory unit must be free. In this condition the terminal FH2 of the "In" trunk terminal set will be at approximately earth potential, consequently there is substantially no grid bias on the valve VS1 which accordingly conducts heavily with the result that its anode potential is low. The low anode voltage of valve VS1 results in the valve VS2 being cut-off and the anode voltage of the tubes CT1—CT3 being below the value required to maintain a discharge in these tubes.

When a forward hold signal of approximately −10 v. is applied to terminal FH2, this potential is applied to the control grid of valve VS1 via the slow release circuit comprising condenser CS4, rectifier MRS4 and resistance RS5. Appearance of the −10 v. signal on terminal FH2 causes the condenser CS4 to charge rapidly via the forward direction of rectifier MRS4. When the signal is eventually removed from terminal FH2, condenser CS4 discharges only slowly through the resistance RS5. The valve VS1 is cut-off by the application of the −10 v. forward hold signal to its control grid and consequently the potential of its anode rises. This rise of potential is applied from the junction of resistors RS7 and RS8 to the control grid of valve VS2 which conducts and causes the junction point of its anode resistors RS9 and RS10, to fall, resulting in the application of approximately −10 v. signals to the backward hold lead BH2 and to the forward hold lead FH1. The rise in anode potential of valve VS1 is also applied to the anode of the cold cathode tube CS1, and a positive going pulse is also applied to the striker electrode of this tube via the condenser CS5, resistors RS11, RS12 and rectifier MRS5, causing the tube CT1 to strike. (The resistor RS12 is a current limiting resistance and the function of rectifier MRS5 is to prevent a negative going pulse developed through condenser CS5 when the anode potential of value VS1 is restored at the end of the call, causing a cathode-to-striker discharge in the tube CT1.) The striking of tube CT1 causes the potential of its cathode to rise to about +100 volts. The rise in cathode potential of CT1 is applied via condensers CS6a and resistor RS15 to the striker electrode of tube CT4 which also strikes, and due to the passage of the discharge current of this latter tube through the resistors RS16 and RS17 the potential of the junction point of these resistors rises until it is clamped to earth potential by conduction of the rectifier MRS8. The junction joint of resistors RS16 and RS17 is connected to the resistor RS1 of the ringing control tone switching gate and the rise in potential of the junction point enables the gate switching rectifier MRS1 to conduct and thus the ringing control tone is able to pass via condenser CS1 to the primary of transformer TT1, the secondary of which is connected to the speech channel in the direction of the called subscriber.

In the called subscriber's line circuit receipt of the ringing tone causes ringing current to be applied to the subscriber's line wires and the 17 cycle A. C. voltage developed over the resistance RA1 (Fig. 3), results in an intermittent backward hold signal being applied to the demodulator associated with the called line circuit in the primary unit switch having access to the called line circuit, and this intermittent backward hold signal is transmitted by pulse modulation back through the connection until it arrives over lead BH1 at the supervisory unit (Fig. 11).

Normally, the valve VS3 of the supervisory unit passes a substantial anode current and its anode potential is low. Receipt of the intermittent backward hold signal of −10 v. over lead BH1 results in the valve VS3 being intermittently switched on and off, consequently, a train of positive-going pulses is generated at the junction of the anode resistors RS18 and RS19 of this valve. These positive-going pulses are applied via condenser CS6 to the striker of the cold-cathode tube CT2. The potential of +50 v. which is also applied to the striker of this latter tube from the junction of the CT1 cathode resistors RS13 and RS14, provides a pedestal for the positive pulses applied from the junction of resistors RS18 and RS19, and in this condition the tube CT2 strikes, extinguishing the tube CT1 as it does so, due to the inclusion of the common anode resistance RS6. The rectifier MRS6 serves as a D. C. restoring rectifier for the pulses passed through the condenser CS6. Due to the striking of tube CT2, current flow through the cathode resistors RS21 and RS22 causes the potential of the junction of these resistors to rise until the junction point is clamped to earth potential by conduction of the rectifier MRS7. The rise in potential of the junction of resistors RS21 and RS22 causes the gate circuits comprising rectifier MRS2 and resistor RS2 to open as described above in connection with the ring control tone gate circuit, and ringing tone is applied to the return speech path to the calling subscriber.

The circuit remains in the above described condition, i. e. with the ringing control tone being transmitted to the called subscriber's line circuit and with ringing tone being transmitted to the calling subscriber, until the called subscriber answers. As a result of the called subscriber's answering, the intermittent backward hold signal developed in his line circuit becomes steady and this steady backward hold signal is applied over lead BH1 of the supervisory circuit to the control grid of valve VS3 to cut this valve off completely. The steady rise in anode potential of VS3 allows the condenser CS7 to charge through resistor RS4 to a potential sufficient to strike the tube CT3, which thereupon extinguishes the tube CT2 due to the inclusion of the common anode resistance RS6 and results in the ringing tone gate circuit being closed to terminate the transmission of ringing tone to the calling subscriber. The rise in cathode potential due to the striking of tube CT3 is applied via the condenser CS8 and resistor RS20 to strike the tube CT5, which extinguishes the tube CT4 due to the inclusion of the common anode resistor RS23. Due to the extinction of tube CT4 the ringing control tone gate circuit is closed and the transmission of ringing control tone to the called subscriber's line circuit is terminated. The tube CT5 has in its anode circuit a resistance-condenser combination comprising high resistance RS24 and condenser CS9 and these components are designed to make the tube self-extinguishing, the resistor RS24 being of such a value that the current which it passes is insufficient to maintain a discharge in the tube CT5. When the tube is fired its anode current charges the condenser CS9, the rise in potential across the condenser causing the anode voltage of the tube to be depressed until the tube is extinguished. As a result of the striking of the tube CT5 the metering control tone gate circuit is opened by the rise in potential of the junction of the cathode resistors RS25 and RS26 as previously described for the ringing gates, and a short-burst of meter control tone is applied to the return speech path via transformer TT2 to effect operation of the calling subscriber's meter. A through communication path between the calling and called subscribers has now been established and conversation may proceed.

At the end of the call when the calling subscriber replaces his receiver the forward hold signal from his line circuit is removed resulting in the removal of the forward hold signal from lead FH2 of the supervisory circuit, and the potential of this lead returns to approximately that of earth. Due to the connection of the rectifier MRS4, condenser CS4 in the grid circuit of valve VS1 discharges slowly delaying the operation of the valve for about 200 m. s. to prevent the circuit releasing to a fleeting disappearance of the forward hold signal.

The eventual attainment of earth potential by the control grid of valve VS1 causes this valve to conduct heavily once more, and its anode potential falls. The fall in anode potential of valve VS1 causes the tube CT3 to be extinguished and the control grid of valve VS2 is carried negative with respect to —100 volts causing this latter valve to be cut-off. The potential of the junction of resistors RS9 and RS10 in the anode circuit of valve VS2 consequently rises to earth potential resulting in the removal of both the backward hold signal over lead BH2 and the forward hold signal over lead FH1.

In the secondary unit switch on the calling side of the supervisory unit, the removal of the backward hold signal from the wire BH2 of the trunk SBU causes the identification multiplex SMX2 (Fig. 8) to remove the inhibiting identification pulse corresponding to the trunk SBU from the inhibiting gate SI1, thereby freeing the trunk for further use.

At the same time the output pulse from the modulating gate SGA is removed, resulting the delay line maintaining pulse being removed from leads 704, 705 and 706. The maintaining gates SG5 and SG6 are consequently closed to this pulse from the delay line pair SDL 3 and SDL 4, thus removing the pulse from storage in these delay lines. Removal of the pulse from storage causes the pulse to disappear from lead 701 to remove the inhibition from gate circuit SG3 thus freeing the pulse for use in this circuit.

Removal of the pulse from the highway 705 also causes the pulse to disappear from the link pulse highway and from the primary unit switch highway leads 506 and 416. The maintaining pulse over leads 507 and 417 is consequently removed and the maintaining gates PG12 and PG13 associated with the calling subscriber's delay line pair PDL1 and PDL2 are consequently closed to this pulse, thus removing the pulse from storage in these delay lines. The calling subscriber's modem accordingly ceases to operate and the backward hold signal on lead 418 is removed with the result that identification multiplex circuit PMX3 removes the identification pulse corresponding to the calling subscriber from the inhibiting leads to the gate circuits PI1 and PI2, thus removing the engaged marking from the calling subscriber's line. Removal of the pulse from storage in the delay lines also causes the pulse to be removed from the inhibiting leads 423, 409 and 513 to remove the inhibition to this pulse in gate circuits PG3 and PG37 thus rendering the pulse free for use on other calls.

As a result of the above described action the circuits on the calling side of the supervisory unit have been restored to normal and as a result of the removal of the forward hold signal from the trunk SRU on the called side of the supervisory circuit, the secondary unit switch and the elements of the primary unit switch associated with the called subscriber are restored to normal in the same manner as described above and the pulse used is rendered free for use on other calls.

Continuing the description of the circuits, the operation of these in the case of junction calls will now be considered. As previously described, junctions outgoing to other exchanges are connected to the selector sides of secondary unit switches such as that shown in Figs. 6, 7 and 8 via outgoing junction relay sets, while junctions incoming from other exchanges are connected to the selector sides of primary unit switches such as that shown in Figs. 4 and 5 via incoming junction relay sets. Since the detailed circuit operation of Figs. 4 to 10 has already been described in connection with a subscriber to subscriber call, only a brief outline of this circuit operation to enable the operation of circuits in junction calls to be appreciated, will now be given.

The case of a subscriber to junction call will first be considered and it will be assumed that a subscriber connected to the primary unit switch shown in Figs. 4 and 5 wishes to call a subscriber connected to another exchange and consequently initiates the necessary junction call. On removal of his receiver the calling subscriber will be connected to a free register as previously described in connection with a subscriber to subscriber call, and upon receipt of the dialled digits the selected register applies for and takes the exchange marker into use.

In the secondary unit switch to which the required outgoing junction or junction group is connected, the backward marking wires BM2 (Fig. 8) connected to the identification multiplex SMX1 are each associated with a particular outgoing junction and upon receipt of the junction call routing information from the register the exchange marker applies the backward marking potential(s) to the backward marking wire(s) BM2 corresponding to the required outgoing junction or junction group, the backward marking wires associated with outgoing junctions being directly connected to the exchange marker and not to a circuit such as a supervisory unit as in the case of local trunks. The backward marking potential(s) applied to the multiplex SMX1 (Fig. 8) cause the primary and secondary unit switches Figs. 4 to 8 to operate in precisely the same manner as that brought about by receipt of the backward marking on wire BM2 in the case of the subscriber to subscriber call. This subsequently results in the forward hold signal being passed via lead FH2 to the outgoing junction relay sets associated with the selected outgoing junction.

An outgoing junction relay set (Fig. 13) comprises a hybrid transformer OGT1 with its balancing network OGR1 for connecting the four wire trunk to the two wire junction outgoing from the associated secondary unit switch, a thermionic valve OGV1 in the anode circuit of which an impulse repeating relay A is connected, and switching relays B and C.

At the outgoing junction relay set, the forward hold signal from the secondary unit switch, which is a —10 v. D. C. potential, is passed over lead FH2 and resistance OGR2, to the control grid of the valve OGV1 thus cutting off this valve and bringing about the release of relay A which is normally operated. Release of relay A results in the operation of relay B over contact a1. Contact b1 prepares the operating circuit for relay C, and contact b2 on changing over applies the backward hold signal —10 v. D. C., via the backward hold lead BH2 and the secondary unit switch thus resulting in circuit action thereat as previously described in connection with the calling subscriber side of a subscriber to subscriber call. Contact a2 in restoring completes the looping of the junction wires via the secondary windings of the hybrid transformer OGT1 and this loop is extended over the junction pair to the corresponding incoming junction relay set at the distant exchange, to which the called subscriber is connected.

Impulses are received at the outgoing relay set as changes in potential of lead FH2, the lead being earthed during periods corresponding to the "break" period of a dialled impulse. When lead FH2 is brought to earth potential relay A re-operates and closes the prepared circuit for relay C at contact a1. Contact a2 repeats the impulses by opening the loop over the outgoing junction. Operation of relay C closes at contact c1 a low impedance impulsing path over the outgoing junction and also prevents inductive disturbances to impulse repetition from the transformer OGT1. Relays B and C remain operated during impulse transmission by reason of their slow releasing characteristics and at the end of an impulse train relay A is released and is followed by the release of relay C but relay B remains operated. When the connection is eventually released earth potential replaces −10 v. on lead FH2 and relay A re-operates. Relay C re-operates but the circuit of relay B is held open beyond its release period so that that relay releases and at contact b1 releases relay C and at contact b2 earths wire BH2 thus removing the backward hold signal. Contact a2 opens the outgoing junction loop.

An incoming junction relay set is shown in Fig. 12 and comprises a hybrid transformer IJT1 with its balancing network IJR1. Looping of the junction wires results in the flow of current from earth over resistance IJR2, upper half of secondary winding of hybrid transformer IJT1, the junction loop, lower half of hybrid transformer secondary winding to 50 v. negative battery. Due to this flow of current in the above traced circuit a potential difference of approximately −10 v. is developed across resistance IJR2 and is applied as a forward hold signal to the wire FH.

It will be assumed that the incoming junction relay set is connected to a primary unit switch such as that illustrated in Figs. 4 and 5. The forward hold signal over lead FH (Fig. 12) will appear on lead 401 (Fig. 4) causing the identification multiplex circuit PMX2 to generate the pulse assigned to the junction. A register is taken into use and impulses received over the junction are transmitted over lead FH to the register as for a call incoming from a subscriber and a connection is set up between the junction and the called subscriber over the primary and secondary unit switches in the manner previously described for a subscriber to subscriber call. The connection is released by the removal of the forward hold signal from lead FH as in the case earlier described.

Junctions may be connected in tandem in a similar manner. Reference to Fig. 1 shows such a connection using the lowest of the three primary and secondary unit switches shown connected by the highway for pulses of the group PQR.

Figures 14, 16:
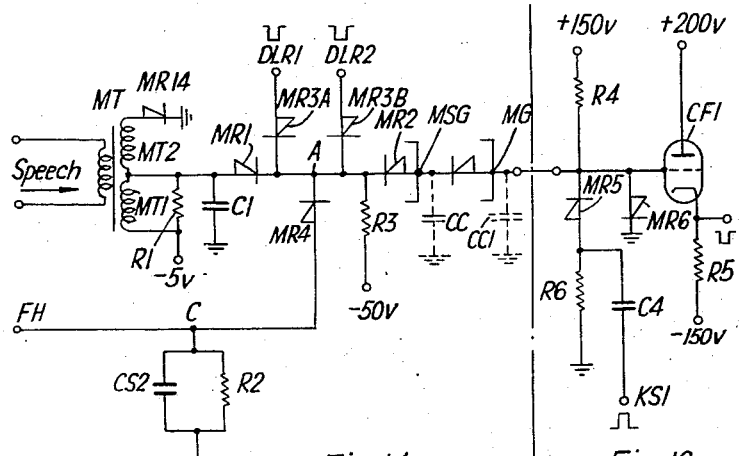
Figure 15:
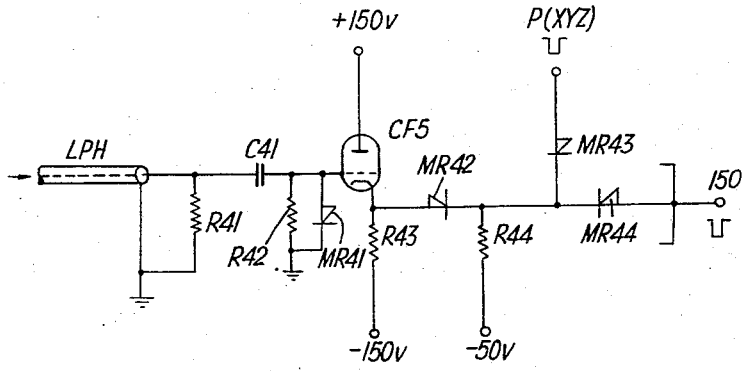
Figure 19:
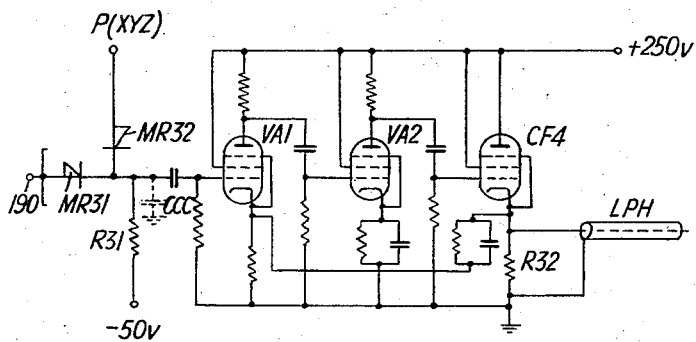
Figure 20:
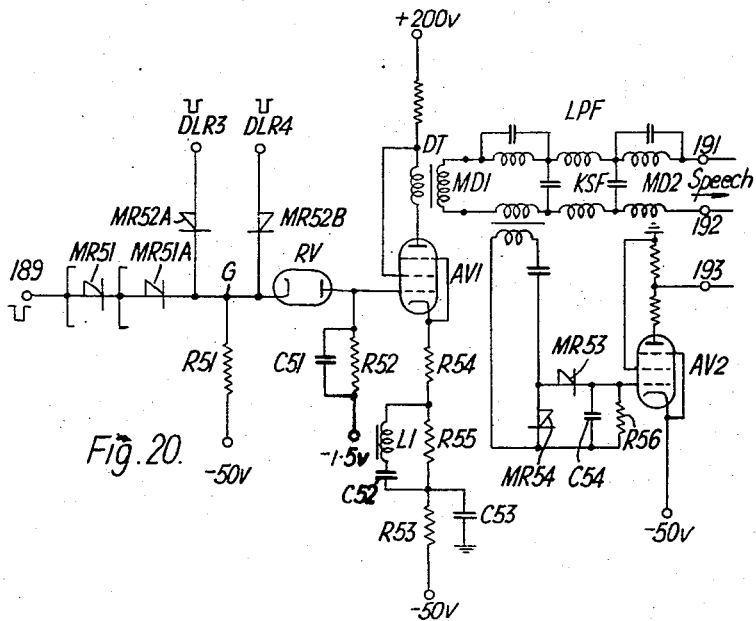
Figure 17:
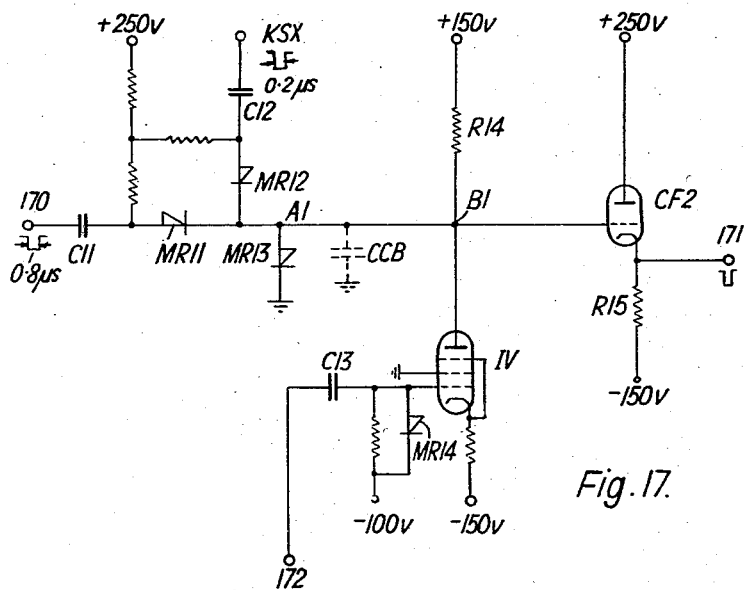
Figure 18:
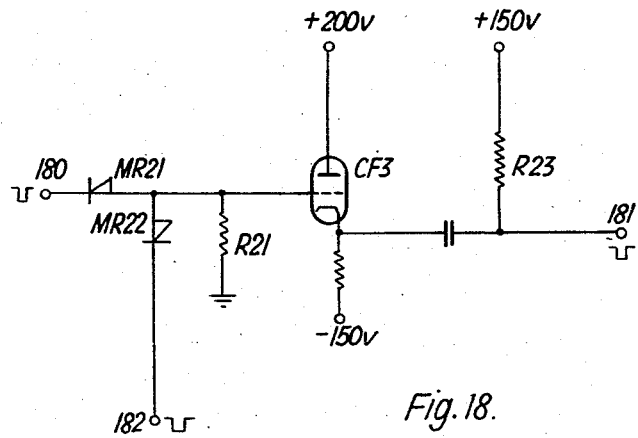

A description will now be given of the details of the modulators and de-modulators and gates in the speech paths. The elements comprising the "go" speech transmission path through a primary and secondary unit switch are shown in Figs. 14, 16, 17, 18 and 19 which should be assembled in the order named from left to right. For the "return" speech transmission path Figs. 15, 16, 17, 18 and 20 should be assembled in the order named from left to right. Fig. 14 illustrates a pulse modulator circuit and Fig. 16 a discharge circuit, the two figures when taken together illustrating the modulators designated PGA (Fig. 4), SGA, SGD (Fig. 7) and RGB, RGD (Fig. 10). Fig. 17 illustrates an inhibiting gate circuit such as those designated PI and SI in Figs. 4–8. Fig. 18 illustrates a one-way gate such as those designated PG11, PG14 and PG36 (Fig. 5) and Fig. 19 shows the circuit of a group pulse gate combined with an output pulse amplifier. Such gates are those designated PG6, PG18, PG21, PG32 (Fig. 5) and SG19, SG20 (Fig. 6). Fig. 15 illustrates a trunk terminating and group pulse gate such as those designated PG7, PG15, PG19, PG20, PG29 (Fig. 5) and SG17, SG18 (Fig. 6) and Fig. 20 illustrates a pulse demodulator circuit such as those designated PGB (Fig. 4), SGB, SGC (Fig. 7) and RGA, RGC (Fig. 10).

Reference will first be had to the "go" speech transmission path commencing with Fig. 14. The modulating gate comprises an input transformer MT, a modulating rectifier MR1, three gate switching rectifiers MR3A, MR3B, and MR4 and commoning rectifiers MR2 and MR2A. The input transformer MT has two secondary windings, the secondary winding MT1 is the winding across which the audio frequency voltages to be modulated are developed and the secondary winding MT2 is arranged in conjunction with the serially connected rectifier MR1A to operate as a limiter winding to limit the depth of pulse modulation effected by the circuit. The gate circuit rectifiers MR3A and MR3B are connected via terminals DLR1 and DLR2 to the output pulse highway from the pair of delay lines associated with this pulse modulator circuit, while the gate circuit rectifier MR4 is connected to the backward or forward hold lead FH from the associated line or supervisory circuit or the like with which the modulator is associated, and to earth via the parallel resistance condenser combination C2, R2. Within the delay line circuits the output pulse highways are connected to earth via low impedance transformer windings thus in the absence of any output pulse from the associated pair of delay lines current passes through the rectifiers MR3A and MR3B and the associated resistor R3, to a −50 v. source. Similarly in the absence of a backward or forward hold signal on the lead FH current passes from earth via resistor R2, and through rectifier MR4 and resistor I3 to the −50 v. source. As a result of current flow in the above traced circuits, the point A in the modulating circuit is anchored to earth potential and the components of the circuit are so chosen that the point A will remain anchored to earth potential so long as any one of the three gate switching rectifiers is passing current. Thus although a negative going pulse from the delay line associated with the gate switching rectifier MR3A will bias this rectifier to its non-conducting condition, the continued conduction of rectifier MR3B and MR4 will maintain the point A substantially at earth potential. Even if both rectifiers MR3A and MR3B are biased to non-conduction by co-incident pulses from the pair of delay lines associated with the modulator, the point A will still remain at earth potential due to the conduction of rectifier MR4. The capacitance C2 is sufficiently large to prevent the potential of point C falling appreciably below earth when it is charged during each pulse which renders rectifiers MR3A and MR3B non-conducting, and the resistance of R2 is such that C2 can discharge during the intervals between pulses. So long as the point A in the modulating circuit remains at earth potential the modulating rectifier MR1 will be biased to non-conduction by the −5 v. bias potential applied to the lower end of the transformer winding MT1 and hence there will be no output from the modulator. Upon receipt of a backward or forward hold signal the potential of point C falls to approximately −10 v. and when rectifiers MR3A and MR3B are biased to non-conduction by receipt of co-incident pulses from their delay line pair, the potential of point A falls until rectifier MR1 conducts and clamps the potential of point A to that of point B which, in the absence of any audio voltage will be approximately −5 v. The modulator gate thus generates output pulses corresponding to the pulses stored in the associated pair of delay lines, i. e. pulses 0.8 microseconds wide at 10 k./s. recurrence frequency. In order that the rectifier MR1 may clamp the potential of point A accurately to the sum of the potentials of the audio voltage developed over the transformer secondary winding MT1 and the bias source, these two sources should be of low impedance. However it is desirable for the modulating signal source impedance to be high in order that the transformer MT may have a step-up ratio to obtain a large modulating voltage. These requirements are reconciled by providing the secondary winding with a low impedance load circuit comprising the resistor R1 and condenser C1. The condenser C1 is chosen to be sufficiently large for the potential difference across it to change little during a pulse when current flows through rectifier MR1 and the resistance of R1 is made sufficiently small for the shunting effect of the reactance of C1 at high modulating frequencies to be negligible. In the event of a modulating voltage tending to drive the upper end of winding MS2 beyond earth potential, the rectifier MR1A conducts and clamps this end to earth potential and the turns ratio between windings MT1 and MT2 is such that when this occurs the potential of point B is approximately —2.5 volts, so ensuring that an output pulse from the modulating circuit cannot be wiped out by the modulation.

The modulating gate circuits forming a sub group are commoned together at the point MSG and the sub-groups are commoned together at the point MG. Rectifiers MR2 and MR2A are poled so as to prevent any direct coupling between the various modulating circuits forming a group. In commoning the modulating circuits of a group however, a considerable stray capacitance is introduced by the commoning leads themselves, and coupling due to this is avoided by the discharge circuit shown in Fig. 16 as follows. The stray capacitance due to the commoning is indicated in Fig. 14 by the dotted condensers CC and CC1. When the point A is at earth potential, current from the +150 v. source (Fig. 16) flows via high resistance R4 and rectifier MR6 to earth and the rectifier clamps the grid of the cathode follower valve CS1 to earth potential. When the point A is driven negative by the operation of the gate switching rectifiers an initial charging current flows from the stray capacitance via rectifiers MR2 and MR2A and resistor R3 to the —50 v. source, the stray capacitance being charged to the sum of the modulating and bias voltages, rectifier MR6 is biased to cut off and therefore a small current flows from the +150 v. terminal via resistor R4, rectifiers MR2A and MR2, and resistor R3 to the —50 v. terminal thus enabling the rectifiers to clamp the grid of the cathode follower valve CF1 to the sum of the modulating and bias potentials. When the rectifier switching gate again closes, point A returns to earth potential and consequently rectifiers MR2 and MR2A become non-conducting. Since the resistance of R4 is high, the stray capacity CC cannot discharge through it readily. To get the stray capacitance discharged rapidly, it is arranged that upon rectifiers MR2 and MR2A becoming non-conductive due to the disappearance of the delay line pulses, a short duration positive pulse, derived from the communication TDM clock pulse source is applied via terminal KS1, and condenser C4 to earth over resistor R6 causing rectifiers MR5 and MR2A to conduct momentarily and discharge the stray capacitance CC. The cathode follower valve CF1 serves to provide a high load impedance to the modulator circuits and a low source impedance R5 to the pulse highway PH through the switch.

The inhibiting gate circuit of Fig. 17 serves to inhibit the pulses used in setting up a call from the link highway. The gate comprises pulse width timing rectifiers MR11 and MR12, inhibiting valve circuit IV and output cathode follower circuit CF2. The function of the pulse width timing rectifiers is to reduce the width of the channel pulses from the pulse modulator circuit prior to their inhibition. This is necessary because, to ensure complete inhibition of a pulse, the inhibiting pulse must overlap the channel pulse in time, and the inhibiting pulses from the register pulse highway are nominally of the same (0.8 microsecond) duration as the channel pulses. The 0.8 microsecond duration channel pulses are applied via terminal 170 and condenser C11 to rectifier MR11, and a train of 0.2 microsecond duration clock pulses are applied via terminal KSX and condenser C12 to rectifier MR12. In the absence of both of these pulses, the rectifiers MR11, MR12 and MR13 conduct, the latter rectifier clamping points A1 and B1 to earth potential. Shortly after the beginning of a channel pulse, a clock pulse occurs and rectifiers MR11 and MR12 are cut off. In the absence of an inhibiting pulse the inhibiting valve IV is biased so that it passes sufficient anode current to drive the point B1 negative, charging the stray capacitance CCB as it does so, until the amplitude of the negative excursion of point B1 equals the amplitude of the received channel pulse, whereupon rectifier MR11 begins to conduct once more. The amplitude of the clock pulse is arranged to be such that it is always greater than the amplitude of the largest channel pulse that can be received in order to ensure that rectifier MR12 remains cut off until the termination of the clock pulse whereupon rectifier MR12 again conducts and a current flows firstly to discharge the stray capacitance CCB and then to earth via rectifier MR13 which again clamps the points A1 and B1 to earth potential. The negative going pulse developed at point B1 is applied to the control grid of the cathode follower valve CF2 and to corresponding negative going pulse is developed over its cathode resistor R15 and passed via output terminal 171 to the input terminal 180 of the one way gate of Fig. 18. Should the channel pulse in Fig. 17 require to be inhibited, a negative going 0.8 microsecond pulse is applied from the register pulse highway over terminal 172 and condenser C13 to the control grid of the inhibiting valve IV cutting off this valve and permitting a current to flow via R14 to earth via rectifier MR13 so maintaining point A1 clamped to earth potential when rectifiers MR11 and MR12 are both cut-off due to receipt of co-incident channel and clock pulses. Rectifier MR14 provides for the direct current restoration of the pulses applied to terminal 172 after their passage through condenser C13.

The one-way gate of Fig. 18 comprises the rectifiers MR21 and MR22 and a cathode follower output valve CF3. The rectifier MR21 is connected over terminal 180 to terminal 171 of Fig. 17 and the rectifier MR22 is connected to the output of a cathode follower valve located in a circuit in the register pulse highway and terminal 182. In the absence of a channel pulse on terminal 180 and a register-switch pulse on terminal 182 neither rectifier MR21 nor MR22 conducts and the control grid of the cathode follower CF3 is maintained at earth potential by the earth connected resistor R21. Upon a negative going pulse being applied to either of the terminals 180 or 182, the corresponding rectifier MR21 or MR22 conducts, and the non-conducting rectifier is biased back, thus enabling the pulse to be developed at the control grid of the cathode follower CF3 by current flow through resistor R21 and the pulse is reproduced by the cathode follower action of the valve at the output terminal 181, from whence it is passed to terminal 190 of the group pulse gate circuits, one of which is shown in Fig. 19.

In the system of the present invention there is provided one pulse group gate circuit and associated output pulse amplifier for each of the pulse groups forming the main communication time division multiplex system. The circuits are commoned together at their input terminals and comprise a pulse group gate circuit, consisting of rectifiers MR31 and MR32 and resistor R31, and an output pulse amplifier, which amplifies the communication pulses prior to transmission over the associated link pulse highway such as LPH in Fig. 19, and which consists of amplifying valves VA1 and VA2 and an output cathode follower valve CF4. The pulse group gate circuits are distinguished from one another by the application of a different group pulse train to the terminal P(XYZ) for the control of the switching rectifier MR32 in each gate circuit the bracketed letters indicating the group of pulses concerned, (XYZ) being quoted only as an example. The operation of the pulse group gate circuit shown in Fig. 19 is as follows: The potential of the junction between the rectifiers MR31 and MR32 and resistor R31 is, in the absence of any highway or group pulse, clamped to earth by the conduction of MR32. When the gate receives co-incident negative pulses from the highway via terminal 190 and from the group pulse source via terminal P(XYZ) both these rectifiers are cut off and the current in R31 which charges the stray capacity CCC causes the potential of the junction between resistor R31 and rectifiers MR31 and MR32 to fall. This point therefore goes negative until rectifier MR31 begins to conduct again and in doing so clamps the potential of the junction point to that of terminal 190. The amplitude of the negative going pulse applied to the control grid of the amplifier valve VA1 is thus determined by the amplitude of the highway pulse on terminal 190, the amplitude of the pulses from the group pulse source via terminal P(XYZ) being arranged to exceed the largest amplitude highway pulse that can be received. The amplifier valves VA1 and VA2 are resistance-capacity coupled and consequently a negative going input pulse results in an amplified negative going output pulse appearing at the anode of valve VA2. The amplifier valve VA2 is also resistance capacity coupled to the cathode follower valve CF4 and the negative going input pulse from valve VA2 results in a negative going pulse being developed over the load resistance R32. The cathode of the cathode follower valve is coupled to the cathode of the first amplifier valve VA1 via a resistor and condenser connected in parallel so as to provide a large amount of overall negative feedback. The cathode follower CF4 provides a low output impedance for feeding the link pulse highway and the negative feedback provides the amplifier with a stable overall gain and a large band width.

The end of the link pulse highway LPH remote from that shown in Fig. 19 is terminated on a group pulse gate circuit as shown in Fig. 15. The circuit comprises a terminating resistor R41, a cathode follower valve circuit CF5 and a group pulse gate circuit comprising rectifiers MR42 and MR43.

The negative going pulses from the link pulse highway LPH are developed over resistor R41 and are applied via condenser C41 and resistor R42 to the control grid of the cathode follower valve CF5, direct current restoration of the pulses developed across R42 being effected by the rectifier MR41. The negative going channel pulses from the cathode of valve CF5 are applied to the group pulse gate circuit comprising rectifiers MR42, MR43 and resistor R44. The operation of this gate is exactly the same as the group pulse gate circuit previously described in connection with Fig. 18 and the channel pulses from the gate circuit are fed via rectifier MR44 and terminal 150 to a pulse highway in common with the outputs from other group gate circuits. In this "return" communication path the terminal 150 is connected by a discharging circuit as shown in the previously described Fig. 16 via an inhibiting gate circuit such as shown in the previously described Fig. 17 and a one way gate circuit such as shown in the previously described Fig. 18 to a pulse de-modulator circuit such as shown in Fig. 20.

The pulse de-modulator circuit shown in Fig. 20 comprises commoning rectifiers MR51 and MR51A, a "co-incidence of two" gate circuit comprising rectifiers MR52A and MR52B and resistor R51, a pulse lengthening circuit consisting of a thermionic rectifier RV, a resistor R52 and condenser C51, an amplifying output valve AV1 the output of which is fed into a balanced low pass filter LPF, and a forward hold signal generating valve AV2 which is coupled to the low pass filter via transformer CT and the voltage doubling network formed by rectifiers MR53 and MR54 and condenser C54.

Negative going channel pulses to be de-modulated are applied to terminal 189 over the pulse highway from terminal 181 (Fig. 18). The terminals DLR3 and DLR4 are respectively connected to the output terminal of each of the delay lines of the pair allocated to this demodulator circuit and, as in the case of the modulator circuit of Fig. 14, the rectifiers MR52A and MR52B serve to keep the point G anchored to earth potential so long as one or both of the rectifiers are conducting. In the absence of a channel pulse on terminal 189, receipt of co-incident pulses from the delay line pair on terminals DLR3 and DLR4 cause the rectifiers MR52A and MR52B to be biased back and consequently point G and terminal 189 will be driven negative, biasing back the other series rectifiers corresponding to MR51 and MT51A in the other commoned de-modulating circuits, while the rectifiers MR51 and MR51A of this de-modulating circuit pass substantially the whole of the current flowing from the +150 volts source via resistor R23 (Fig. 18) to the —50 volts source via R51 in this circuit (Fig. 20). The resultant change in potential of terminal 189 constitutes a small 0.8 microsecond pedestal pulse, and any co-incident negative going channel pulse arriving at terminal 189 will be superimposed on this pedestal. The pulse lengthener circuit is provided with a negative bias of —1.5 volts so that when pedestal pulses only are present little or no output will be obtained from this circuit, but when co-incident channel and pedestal pulses appear at point G the pulse lengthener circuit produces a sawtooth waveform at the grid of the audio frequency amplifier AV1. The gain of valve AV1 is stabilised by A. C. and D. C. negative feedback provided by the resistor R54 and resistor R53 shunted by condenser C53. To compensate for attenuation distortion caused at high audio frequencies by the pulse lengthener, transformer DT and low pass filter LPF, a series tuned circuit L1, C52 is shunted across resistor R55 to reduce the A. C. negative feedback at high audio frequencies by an amount which provides requisite equalisation of the overall gain without allowing the valve to be overloaded by signal components at the pulse recurrence frequency and its harmonics. The output from the valve AV1 is fed via transformer DT to the low pass filter LPF. This filter has a characteristic impedance of 600 ohms and has one constant "K" section KS and two "M" derived half sections MD1 and MD2 and the audio frequency output from the filter is fed to a pair of speech wires via terminals 191 and 192. When the de-modulator circuit is receiving channel pulses a substantial 10 kc. p. s. pulse recurrence frequency component is developed across the "M" derived half section MD1 of the filter LPF and the voltage of this pulse is stepped up by the coupling transformer CT the primary winding of which is included in the "M" derived half section MD1 of the filter and the secondary winding of which is tuned to the pulse recurrence frequency by the condenser C55. The 10 kc. p. s. voltage is rectified by the voltage doubling circuit comprising rectifiers MR53, MR54 and condenser C54 and the resulting D. C. voltage developed over resistor R56 is applied to the control grid of the forward hold generating valve AV2, causing it to conduct and produce at its output terminal 193 a negative going forward hold signal of approximately 10 v.

In the case of the communication path from the register switch to the main communication pulse highway, the modulator circuit is as shown in Figs. 14 and 16, and the de-modulator circuit is as shown in Fig. 20, and these circuits are connected to the inhibiting terminals of inhibiting gate circuits such as that shown in Fig. 17 via "coincidence of two" gate circuits such as formed by the rectifiers MR31, MR32 and resistor R31 in Fig. 19.

In the case of the communication path through the secondary unit switches the "go" path includes Figs. 14, 16, and 19, while the "return" path includes Figs. 15 and 20.

Figure 21:
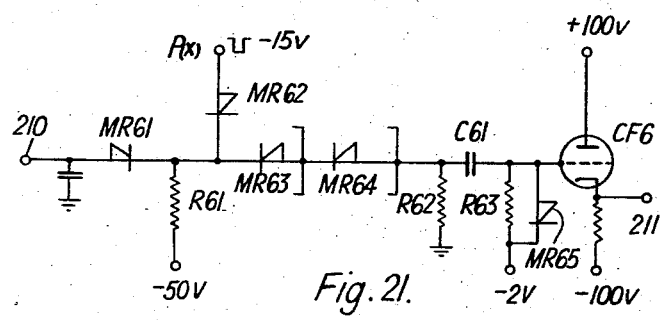
Figure 22:
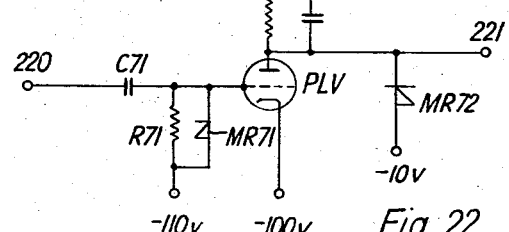
Figure 23:
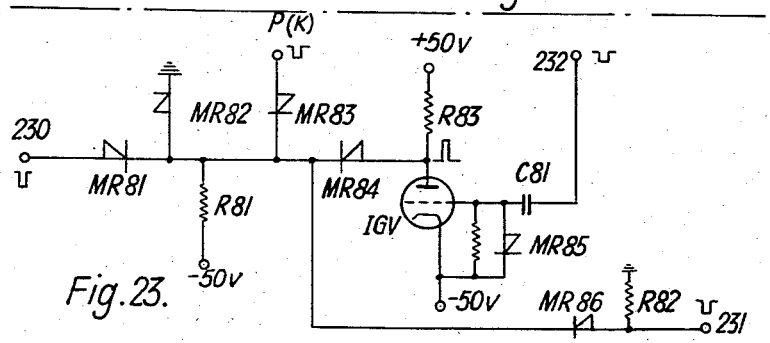
Figure 24:
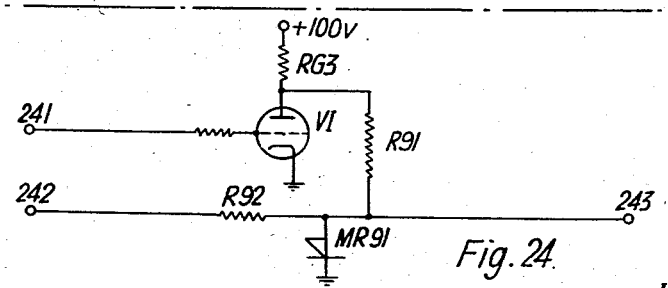
Figure 25:
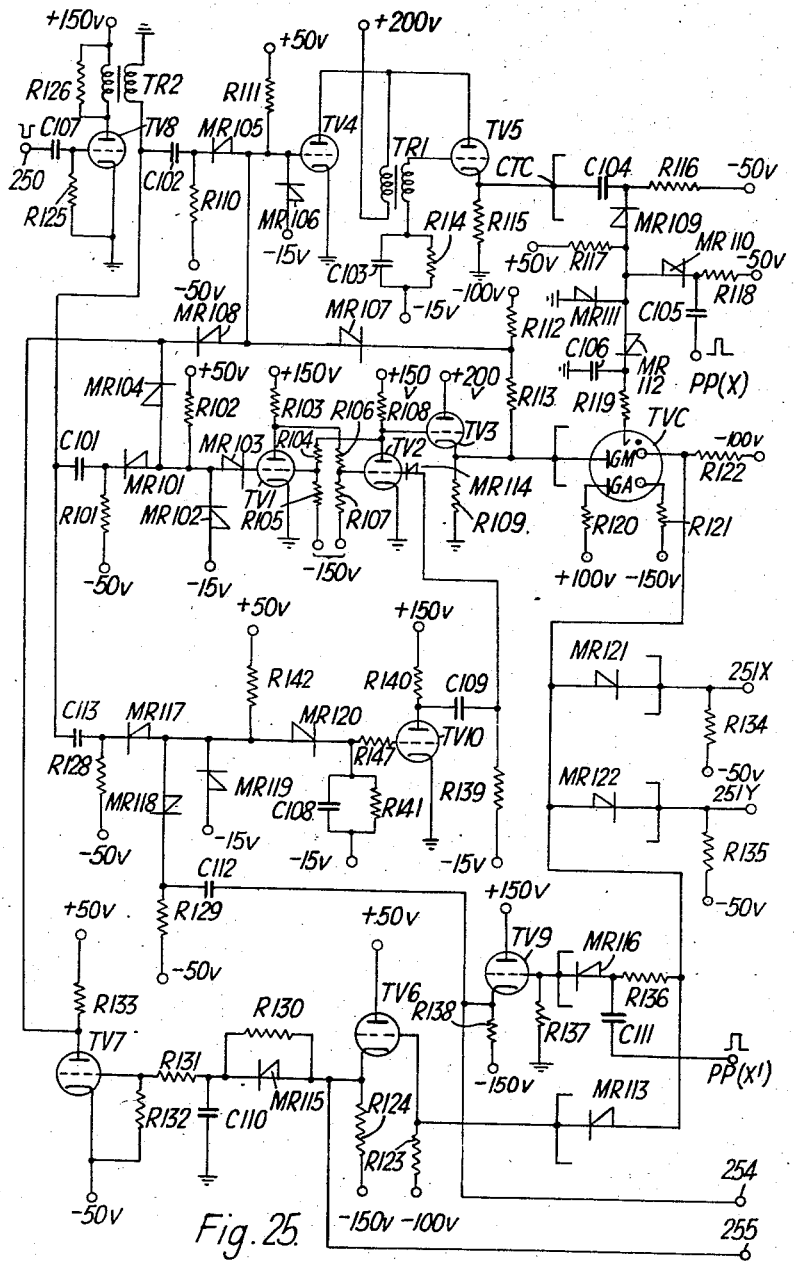

The detailed circuits illustrated in Figs. 21 to 25 will now be described. Fig. 21 illustrates a multiplex circuit such as the identification multiplexes designated PMX1, PMX2, PMX3, in Fig. 4, SMX1, SMX2, SMX3 and SMX4 in Fig. 8 and the multiplexes SMX and RMX in Fig. 9. Fig. 22 illustrates a pulse lengthener circuit such as those designated PL in Figs. 4 and 5, SL in Figs. 6, 7 and 8 and RL1 in Fig. 9. Fig. 23 illustrates an inhibiting gate such as those designated PI1 (Fig. 4) SI1 and SI2 (Fig. 7), Fig. 24 illustrates the D. C. inhibiting gate designated S13 in Fig. 8 and Fig. 25 illustrates the circuits of the several markers such as those designated PTM (Fig. 4), PMS (Fig. 5), SMS (Fig. 6), STM (Fig. 8) and SM, MSP (Fig. 9).

Reference will first be had to Fig. 21. The multiplex circuit comprises a number of gate circuits, one for each trunk served by the switch, and each gate circuit consists of three rectifiers such as MR61, MR62, MR63 and a resistor such as R61 connected to a —50 v. source. Each rectifier MR62 is supplied over terminal P(x) with a pulse train, the pulses of which occupy a time position in the identification time division multiplex system corresponding to the trunk with which the gate circuit is assocated. Sub-groups of these gate circuits are commoned, the common circuit including rectifier MR64 and all the sub-groups are commoned together and connected to an earth connected load resistor R62. When a marking or holding signal of —10 v. is applied to the terminal 210 corresponding to the associated trunk (BM, FH or BH leads, as the case may be) the corresponding rectifier MR61 is biased back so that, when the negative going pulse associated with the trunk is applied to terminal P(x), rectifier MR62 is also biased back and a stray capacity charging current flows through resistor R61, rectifiers MR63, and MR64 to produce a negative-going pulse across resistor R62. This pulse is applied via condenser C61 and resistor R63 to the cathode follower valve CF6 which reproduces the pulse at the output terminal 211. Since the amplitude of the pulse applied to terminal P(x) is greater than the amplitude of the marking or holding signal applied to terminal 210, the amplitude of the output pulse obtained from terminal 211 is approximately the same as that of the applied marking or holding signal. The rectifier MR65 provides for the D. C. restoration of the pulse developed over resistor R62 after its passage through condenser C61.

The pulse lengthener circuit of Fig. 22 has an input terminal 220 to which negative going pulses are applied. In the absence of input pulses, the pulse lengthening valve PLV is biased to cut off and consequently the output terminal is at substantially earth potential. When negative going pulses are applied to terminal 220 the mean potential of the control grid of valve PLV is caused to rise due to the fact that during each pulse rectifier MR71 conducts and rapidly charges condenser C71 while between each pulse the condenser discharge path is via resistor R71. The valve PLV is thus caused to pass anode current and the potential of its anode falls from earth potential until it is anchored to —10 v. by conduction of the rectifier MR72. The circuit thus provides a —10 v. D. C. signal on its output terminal 221 so long as input pulses are being applied to terminal 220.

The isolating gate circuit of Fig. 23 has an input terminal 230, an output terminal 231, an inhibiting terminal 232 and a gating terminal P(K). To this latter terminal is applied a clock pulse train, the pulses of which coincide with every possible time position in the time division multiplex cycle concerned, but whose duration is shorter than that of the pulses applied to the input terminal 230. In the absence of any applied pulses, the junction point of the switching rectifiers and the rectifier MR86 will be slightly negative due to the conduction of rectifiers MR81, MR83 and MR86 from low impedance earth sources to —50 v. via resistor R81. If an input to terminal 230 is one which is not to be inhibited the occurrence of the negative going pulse causes rectifiers MR81 to be biased back and shortly after the onset of this pulse, the shorter duration clock pulse arriving at terminal P(K) causes rectifier MR83 also to be biased back. The valve IGV is unbiased and the valve is consequently passing anode current lowering the anode potential to a point at which rectifier MR84 is biased back, and as a result of the biasing back of the three gate switching rectifiers MR81, MR83, MR84, current flow from earth over resistor R82 via rectifier MR86 to —50 v. via resistor R81 results in a negative going pulse being applied to output terminal 231. If a negative going inhibiting pulse is applied to terminal 232, the valve IGV is cut off causing the anode potential of the valve to rise and allowing rectifier MR84 to conduct. The current which rectifier MR84 passes is arranged to be greater than that which passes through resistor R81 to —50 v., and consequently rectifier MR82 conducts and clamps the junction point of the gate switching rectifiers to earth so preventing any output pulse being produced in response to an input pulse on the input terminal 230.

The inhibiting gate circuit of Fig. 24 has a forward hold terminal 241, and two backward marking terminals 242 and 243. In the absence of a forward hold signal the terminal 241 and consequently the grid of valve VI are at earth potential; the valve VI passes anode current resulting in its anode potential being low, and when a backward marking signal of —10 v. appears on terminal 242, current flow through resistors R93, R91 and R92 causes the junction point of resistors R91, R92 and rectifier MR91 to be brought to approximately —10 v. and this extends the backward marking signal to terminal 243. When the forward hold signal —10 v. is present, the valve VI is cut off and its anode potential rises, and when the backward marking signal appears on terminal 242, the current it causes to flow in resistor R92 is less than the current which flows in resistors R93 and R91, consequently rectifier MR91 conducts and clamps the junction point of resistors R92 and R91 to earth potential, thus blocking the passage of the backward marking signal.

The trunk marker and master selector circuit of Fig. 25 comprises ten thermionic valves TV1—TV10 and a group of cold cathode discharge tubes of which only one, tube TVC is shown. This group of cold cathode discharge tubes contains one tube for each pulse in the corresponding time division multiplex. For example, if the circuit is used as a trunk marker in a primary unit switch, the group may contain up to 1000 cold cathode tubes such as TVC; on the other hand, if the circuit is used as a communication pulse master selector the group will contain 100 such tubes. The circuit has an input terminal 250 to which input pulses are applied from an associated pulse highway, a group of terminals to pairs of which D. C. output markings are applied and of which only two (terminals 251X and 251Y) are shown, a pulse output terminal 254 and a "connected" output terminal 255, to which the circuit applies a positive D. C. potential to indicate that it has completed its function. If the circuit is to be used as a trunk marker no connection will be made to the output pulse terminal 254 and in certain circumstances the terminal 255 will also be left unconnected. If the circuit is to be used as a master selector, no connection will be made to the group of terminals 251. Of the ten thermionic valves, valve TV8 is an input pulse amplifying valve, valves TV1, TV2 and TV3 together with their associated rectifiers and resistors serve, in response to an input pulse, to condition the group of cold cathode tubes of which TVC is one, valves TV4 and TV5 and their associated rectifiers and resistors constitute an input selecting circuit for the operation of a particular cold cathode tube TVC as determined by a co-incident pulse over terminal PP($x$), this pulse being derived from the communication TDM cycle. Valves TV6 and TV7 together with their associated circuit elements, constitute an inhibiting circuit to ensure that the selection effected by the valves TV4 and TV5 is a one and one only selection and valves TV9 and TV10 are concerned with the restoration to normal of the circuit after the cessation of the input pulses to terminal 250.

Considering the circuit in greater detail, negative pulses applied to terminal 250 are amplified by valve TV8 which produces positive pulses from the secondary winding of its output transformer TR2. In the absence of input pulses the valves TV1, TV4 and TV10, are biased to −15 v. due to conduction of the associated rectifiers MR102, MR106 and MR119. In the case of valve TV4 the conduction of rectifier MR106 is possible due to current flow from the +50 v. terminal, resistor R111 and firstly, via rectifier MR107, resistor R112 to the −100 v. terminal and via rectifier MR105 and resistor R110 to −50 v. terminal causing the grid potential of the valve to fall until it is clamped by rectifier MR106. In the case of valve TV1, rectifier MR102 conducts due to current flow from the +50 v. terminal, resistor R102 rectifier MR101 and resistor R101 to −50 v. terminal causing the grid potential of valve TV1 to fall until, it is clamped by rectifier MR102, and similarly in the case of valve TV10, rectifier MR119 conducts due to current flow from the +50 v. terminal via resistor R142, rectifier MR117, resistor R128 and also over the parallel connected rectifier MR118 and resistor 119 to −50 v. terminal. Further, the inhibiting valve TV7 is cut off in the absence of any input from the associated cold cathode tubes via valve TV6 due to current flow from −50 v. via resistors R132, R131, R130, R124 to −150 v. and the positive potential on the anode of valve TV7 biases off the inhibiting gate rectifiers MR104 and MR108.

Upon the circuit being taken into use the first positive pulse from the secondary of transformer TR2 is applied via the condensers C102, C101 and C113 to bias back the associated rectifiers MR105, MR101 and MR117 but due to the alternative biasing paths for rectifiers MR106 and MR119 valves TV4 and TV10 are unaffected by this pulse. As a result of the biasing back of the rectifier MR101 the control grid potential of valve TV1 rises until rectifier MR101 again conducts and clamps the grid potential to that of the positive input pulse. This positive pulse is applied to the grid of valve TV1 via rectifier MR103 and the valve conducts, thereby lowering its anode potential and cutting off valve TV2. Valves TV1 and TV2 have their control grids and anodes cross connected via resistors R104—R107 so that the valves form a bi-stable trigger circuit, consequently after the input pulse has terminated valve TV1 remains "on" and valve TV2 remains "off." The rise in anode potential of valve TV2 is conveyed by the cathode follower valve TV3 to provide an effective H. T. supply for the group of cold cathode tubes of which TVC is one. The rise in cathode potential of valve TV3 also results in the junction of resistors R112 and R113 becoming positive with the result that rectifier MR107 is biased back thus removing the alternative biasing path for rectifier MR106. The next positive input pulse from the secondary winding of transformer TR2 is therefore applied via rectifier C102 to cut off rectifier MR105 with the result that the control grid of valve TV4 is driven positive, in the same way as described above for valve TV1. Valve TV4 conduits and since this valve shares a common anode load with valve TV5, the anode potential of both these valves is caused to fall. The valve TV5 is connected in a blocking oscillator circuit and the large positive feed back through transformer TR1 causes a large amplitude positive pulse to be applied to the control grid of this valve resulting in the flow of large anode and grid currents. The grid current produces a large negative charge on the condenser C103 with the result that at the end of the positive input pulse the valve is biased well beyond cut off and the discharge time constant of the combination C103, R114 is made such that the circuit is maintained in its blocked condition for at least the time required for a complete cycle of the pulse train applied to terminal 250. Thus, only one pulse in the cycle is applied to the circuits of the cold cathode tubes from the cathode of valve TV5. Each of the cold cathode tubes is connected to the cathode of a valve such as TV5 over the common point CTC. The tube TVC shown is connected via a pulse lengthener circuit, comprising a rectifier MR112, a condenser C106, and a resistor R119, and a gate circuit comprising rectifiers MR109, MR110 and MR111, resistors R116, R117 and R118 and condensers C104 and C105. The pulse from the cathode of valve TV5 is applied to the gate circuit shown via the condenser C104 and cuts off rectifier MR109. If this pulse is coincident with the pulse which is applied via condenser C105 (the pulse applied to each gate circuit via the terminal PP($x$) occupying a different time position in the time division multiplex system concerned) the rectifier MR110 will also be biased back and the potential of the junction between these two rectifiers biasing back rectifier MR111 until current from the +50 v. terminal via resistor R117 and rectifier MR109 causes the junction point of the gate switching rectifiers to be clamped to the potential of the input pulse applied to condenser C104. Thus when the pulse applied from the cathode of valve TV5 is coincident with the pulse associated with the cold cathode tube TVC, the associated gate circuit applies a positive potential to charge the pulse lengthening condenser C106 via rectifier MR112. The potential of the junction of condenser C106 and rectifier MR112 is thus raised sufficiently to fire the tube TVC. This latter tube is of the type which has a discharge permanently present across an auxiliary gap GA to which current is fed over resistors R121 and R120 which are connected respectively to a −150 v. terminal and a +100 v. terminal, and this discharge serves to increase the sensitivity of the trigger gap. When the main gap GM breaks down, the potential difference across the resistor R122 causes the potential of the main cathode to rise from −100 v. to approximately that of earth. This rise of potential is applied to the pair of output terminals 251X and 251Y associated with the tube TVC, over rectifiers MR121 and resistor R134, and rectifier MR122 and resistor R135, and also to the control grid of valve TV6 which being a cathode follower produces a corresponding rise in potential at its cathode, over resistor R124. This latter rise in potential is applied to terminal 255 for external circuit control if required or for use as a "master selector connected" signal to the common exchange marker. It is also applied via the slow release circuit comprising rectifier MR115 condenser C110 and resistor R130, and via resistor R131 causing a potential difference to appear across R132 and grid-cathode of valve TV7, causing this latter valve to conduct. The potential of the anode of valve TV7 consequently falls below earth potential and this causes the rectifiers MR104 and MR108 to conduct thus inhibiting the valves TV1 and TV4 and so preventing any further input pulses from entering the pulse selecting circuits. The rise in cathode potential of tube TVC also removes the bias from rectifier MR116 thus enabling the positive pulses of the pulse train over terminal PP($x^1$) corresponding to the tube TVC to pass to the control grid of valve TV9 via condenser C111 and resistor R137. These pulses are also derived from the communication TDM cycle. The valve TV9 is a cathode follower and consequently the valve reproduces the pulses received over terminal PP($x^1$) at its cathode, the positive going pulses being applied to output pulse terminal 254, and also via condenser C112 to a "co-incidence of two" gate comprising rectifiers MR117, MR118, MR119 and resistors R128, R129 and R142. The input pulses from terminal 250 are also applied to this gate via condenser C113 and since one of the received pulses must coincide with one of the input pulses the gate opens and passes positive pulses to the pulse lengthener circuit comprising rectifier MR120, condenser C108 and resistor R141 which produces a steady rise in potential of the control grid of valve TV10. This latter valve is normally biased beyond cut off but is caused to conduct by the rise in potential of its control grid. The condenser C109 and resistor R139 forming the output circuit of this valve are arranged to have a very short time constant with the result that they produce a so called "differentiating" action, that is the onset of the current flow through the valve TV10 produces a short duration negative going pulse over resistor R139. This negative going pulse is applied via rectifier MR14 to the trigger circuit valve TV2 but since this valve is already non-conducting the negative pulse is without effect. The circuit now remains in this condition until the input pulses to terminal 250 are terminated whereupon the circuit releases, as follows. When there ceases to be output pulses from the secondary of transformer TR2 which coincides with the pulse from valve TV9, the gate circuit associated with the control grid of valve TV10 is closed. The condenser C108 is rapidly discharged through resistor R141 and valve TV10 is again cut off. The anode potential of the valve rises and due to the differentiating action of condenser C109 and resistor R139, a positive going pulse is applied to the control grid of the trigger valve TV2 which causes valve TV2 to conduct and valve TV1 to be cut off. The fall in anode potential of valve TV2 is applied to the control grid of the cathode follower valve TV3 and the cathode potential of this valve is correspondingly reduced removing the anode potential from the cold cathode tubes such as TVC, causing the tube TVC to be extinguished. The main cathode potential of tube TVC thus falls to —100 v. and consequently the cathode potential of valve TV6 falls also. The control grid of valve TV7 is connected to the cathode of valve TV6 through the slow to release circuit C110, MR115 and R130, consequently when the cathode potential of valve TV6 falls the rectifier MR115 is biased back and the condenser discharges slowly through resistor R130 so that there is a delay before valve TV7 is cut off which ensures that the cold cathode tube TVC has time to de-ionize before the circuit can be taken into use again. When valve TV7 is eventually cut off its anode potential rises to +50 volts thus biasing back rectifiers MR104 and MR108 and allowing input pulses to reach the grid of valve TV1 again.

What is claimed is:

1. An automatic telephone system in which connections within an exchange are set up by a time division multiplex system comprising a plurality of electronic selecting switches each having a selector side and a bank side and each comprising a common pulse highway which links the two sides of the switch and serves for all connections set up over the switch and over which transmission in respect of a connection is effected by a recurrent pulse allocated for the connection, said plurality of electronic selecting switches being arranged in two ranks to form a frame having a plurality of said switches on each side of it, a plurality of individual audio frequency lines connected to the selector sides of switches on one side of said frame, a plurality of audio frequency trunks connected to the selector sides of switches on the other side of said frame, a plurality of link pulse highways linking the bank side of each switch on said one side of said frame to the bank side of every switch on said other side of said frame, for each said audio frequency line a modulator and demodulator forming part of the selector side of the particular switch to which the line is connected and serving for coupling the line to the common pulse highway of this switch so far as transmission over this highway by means of an allocated recurrent pulse is concerned, for each said audio frequency trunk a modulator and demodulator forming part of the selector side of the particular switch to which the trunk is connected and serving for coupling the trunk to the common pulse highway of this switch so far as transmission over this highway by means of an allocated recurrent pulse is concerned, for each said link pulse highway two groups of gate circuits one group forming part of the bank side of a switch on said one side of said frame and comprising gate circuits serving for coupling the link pulse highway to the common pulse highway of this switch so far as transmission by means of certain predetermined recurrent pulses in the time division multiplex cycle is concerned and the other group forming part of the bank side of a switch on said other side of said frame and comprising gate circuits serving for coupling the link pulse highway to the common pulse highway of this switch so far as transmission by means of the same certain predetermined recurrent pulses in the time division multiplex cycle is concerned, said certain predetermined recurrent pulses being different for each link pulse highway connected to a switch, and supervisory equipment connected in and individual to each of said audio frequency trunks.

2. An automatic telephone system in which connections within an exchange are set up by a time division multiplex system comprising aerially connected electronic selecting switches each having a selector side and a bank side and each comprising a common pulse highway which links the two sides of the switch and serves for all connections set up over the switch and over which transmission in respect of a connection is effected by a recurrent pulse allocated for the connection, for the serial connection of said electronic selecting switches a plurality of audio frequency trunks between the selector sides of switches and a plurality of link pulse highways linking the bank sides of switches, supervisory equipment connected in and individual to each of said audio frequency trunks, a plurality of individual audio frequency lines connected to the selector sides of some of said electronic selecting switches, a register, means for allocating one recurrent pulse in the time division multiplex cycle for a connection between said register and the particular one of said electronic selecting switches to which a calling one of said audio frequency lines is connected and for allocating a further recurrent pulse in the time division multiplex cycle for a connection between said register and the particular one of said electronic selecting switches to which a called one of said audio frequency lines, called by said calling one, is connected, and means operative when a connection between said register and said called one of said audio frequency lines has been completed for substituting said further recurrent pulse for said one recurrent pulse for the maintenance of a connection between said calling and called lines.

3. An automatic telephone system in which connections within an exchange are set up by a time division multiplex system comprising a plurality of electronic selecting switches each having a selector side and a bank side and each comprising a common pulse highway which links the two sides of the switch and serves for all connections set up over the switch and over which transmission in respect of a connection is effected by a recurrent pulse allocated for the connection, said plurality of electronic selecting switches being arranged in two ranks to form a frame having a plurality of said switches on each side of it, a plurality of individual audio frequency lines connected to the selector sides of switches on one side of said frame, for each of a plurality of switches on the other side of said frame a plurality of audio frequency trunks connecting the selector side of the switch to the selector sides of other switches on the same side of the frame, a plurality of link pulse highways linking the bank sides of each switch on said one side of said frame to the bank side of every switch on said other side of said frame, for each said audio frequency line a modulator and demodulator forming part of the selector side of the particular switch to which the line is connected and serving for coupling the line to the common pulse highway of this switch so far as transmission over this highway by means of an allocated recurrent pulse is concerned, at each end of each said audio frequency trunk a modulator and demodulator forming part of the selector side of the particular switch to which the trunk is connected at the end concerned and serving for coupling the trunk to the common pulse highway of this switch so far as transmission over this highway by means of an allocated recurrent pulse is concerned, for each said link pulse highway two groups of gate circuits one group forming part of the bank side of a switch on said one side of said frame and comprising gate circuits serving for coupling the link pulse highway to the common pulse highway of this switch so far as transmission by means of certain predetermined recurrent pulses in the time division multiplex cycle is concerned and the other group forming part of the bank side of a switch on said other side of said frame and comprising gate circuits serving for coupling the link pulse highway to the common pulse highway of this switch so far as transmission by means of the same certain predetermined recurrent pulses in the time division multiplex cycle is concerned, said certain predetermined recurrent pulses being different for each link pulse highway connected to a switch, and supervisory equipment connected in and individual to each of said audio frequency trunks.

4. An automatic telephone system in which connections within an exchange are set up by a time division multiplex system comprising a plurality of electronic selecting switches each having a selector side and a bank side and each comprising a common pulse highway which links the two sides of the switch and serves for all connections set up over the switch and over which transmission in respect of a connection is effected by a recurrent pulse allocated for the connection, said plurality of electronic selecting switches being arranged in two ranks to form a frame having a plurality of said switches on each side of it, a plurality of individual audio frequency lines connected to the selector sides of switches on one side of said frame, a plurality of audio frequency trunks connected to the selector sides of switches on the other side of said frame, a plurality of link pulse highways linking the bank side of each switch on said one side of said frame to the bank side of every switch on said other side of said frame, for each said audio frequency line a modulator and demodulator forming part of the selector side of the particular switch to which the line is connected and serving for coupling the line to the common pulse highway of this switch so far as transmission over this highway by means of an allocated recurrent pulse is concerned, for each said audio frequency trunk a modulator and demodulator forming part of the selector side of the particular switch to which the trunk is connected and serving for coupling the trunk to the common pulse highway of this switch so far as transmission over this highway by means of an allocated recurrent pulse is concerned, for each said link pulse highway two groups of gate circuits one group forming part of the bank side of a switch on said one side of said frame and comprising gate circuits serving for coupling the link pulse highway to the common pulse highway of this switch so far as transmission by means of certain predetermined recurrent pulses in the time division multiplex cycle is concerned and the other group forming part of the bank side of a switch on said other side of said frame and comprising gate circuits serving for coupling the link pulse highway to the common pulse highway of this switch so far as transmission by means of the same certain predetermined recurrent pulses in the time division multiplex cycle is concerned, said certain predetermined recurrent pulses being different for each link pulse highway connected to a switch and being, as regards each link pulse highway, pulses which are not consecutive in the time division multiplex cycle, and supervisory equipment connected in and individual to each of said audio frequency trunks.

References Cited in the file of this patent

UNITED STATES PATENTS

| | | |
|---|---|---|
| 2,490,833 | Ransom | Dec. 13, 1949 |
| 2,773,934 | Trousdale | Dec. 11, 1956 |